(12) United States Patent
Sidebottom et al.

(10) Patent No.: US 11,323,374 B2
(45) Date of Patent: May 3, 2022

(54) VISUALIZING NETWORK TRAFFIC PLANS BASED ON EGRESS PEER ENGINEERING

(71) Applicant: Juniper Networks, Inc., Sunnyvale, CA (US)

(72) Inventors: Greg Sidebottom, Ottawa (CA); Patricio Giecco, Upland, CA (US); Byeongseob Ki, Warren, NJ (US)

(73) Assignee: Juniper Networks, Inc., Sunnyvale, CA (US)

( * ) Notice: Subject to any disclaimer, the term of this patent is extended or adjusted under 35 U.S.C. 154(b) by 140 days.

(21) Appl. No.: 16/583,010

(22) Filed: Sep. 25, 2019

(65) Prior Publication Data

US 2021/0092064 A1    Mar. 25, 2021

(51) Int. Cl.

| | |
|---|---|
| *H04L 47/125* | (2022.01) |
| *H04L 41/0826* | (2022.01) |
| *H04L 41/22* | (2022.01) |
| *H04L 43/10* | (2022.01) |
| *H04L 47/80* | (2022.01) |

(Continued)

(52) U.S. Cl.
CPC ........ *H04L 47/125* (2013.01); *H04L 41/0826* (2013.01); *H04L 41/22* (2013.01); *H04L 43/10* (2013.01); *H04L 47/80* (2013.01); *H04L 67/1042* (2013.01); *H04L 67/1078* (2013.01)

(58) Field of Classification Search
CPC ... H04L 41/0253; H04L 41/22; H04L 43/045; H04L 47/10; H04L 47/12; H04L 47/125; H04L 47/80; H04L 47/822; H04L 47/823; H04L 47/829; H04L 41/0823; H04L 41/0826; H04L 43/10; H04L 67/1042; H04L 67/1078
See application file for complete search history.

(56) References Cited

U.S. PATENT DOCUMENTS 8,289,878 B1 * 10/2012 Gonzalez .............. H04L 41/507
370/254
9,021,361 B1     4/2015 Pettinati et al.
(Continued)

OTHER PUBLICATIONS

Wikipedia, "Sankey diagram," https://en.wikipedia.org/wiki/Sankey_diagram, [retrieved Sep. 25, 2019].
(Continued)

*Primary Examiner* — Kan Yuen
(74) *Attorney, Agent, or Firm* — Harrity & Harrity, LLP

(57) ABSTRACT

A traffic planning platform may receive information related to a traffic flow including a traffic bandwidth to transport through a network with various network devices interconnected by links. The traffic planning platform may generate a traffic plan by assigning the traffic flow to a set of the links that includes network resources connecting a source of the traffic flow to a destination of the traffic flow. The traffic planning platform may render a visualization of the traffic plan, wherein the visualization includes a user interface (e.g., a diagram, an animation, and/or the like) in which geometric shapes that represent the source, the peer link, and the destination are connected by bands that represent the tunnel and the external route and further in which the geometric shapes and the bands each have a first visual property and a second visual property based on the traffic bandwidth of the traffic flow.

20 Claims, 12 Drawing Sheets

(51) Int. Cl.
H04L 67/1042 (2022.01)
H04L 67/1074 (2022.01)

(56) References Cited

U.S. PATENT DOCUMENTS

| | | | |
|---|---|---|---|
| 9,300,545 B2* | 3/2016 | Zhang | G06Q 30/02 |
| 10,656,795 B1* | 5/2020 | Pandian | H04L 41/22 |
| 10,958,561 B1* | 3/2021 | Sidebottom | H04L 47/22 |
| 2002/0101821 A1 | 8/2002 | Feldmann et al. | |
| 2002/0186658 A1* | 12/2002 | Chiu | H04L 47/122 |
| | | | 370/237 |
| 2003/0099014 A1* | 5/2003 | Egner | H04J 14/0241 |
| | | | 398/79 |
| 2004/0174865 A1* | 9/2004 | O'Neill | H04L 47/822 |
| | | | 370/352 |
| 2015/0081701 A1* | 3/2015 | Lerios | H04L 43/045 |
| | | | 707/736 |
| 2018/0077119 A1* | 3/2018 | Fields | H04L 43/0876 |
| 2019/0068759 A1* | 2/2019 | Ravi | H04L 45/54 |
| 2019/0334791 A1* | 10/2019 | Hopkins | H04L 43/028 |

OTHER PUBLICATIONS

Extended European Search Report for Application No. EP19210771. 2, dated May 29, 2020, 13 pages.
Riehmann P., et al., "Interactive Sankey Diagrams", Proceeding of the IEEE on Information Visualization, Oct. 23, 2005, pp. 233-240.
Xu J., "Representing Big Data as Networks: New Methods and Insights", arXiv.org, Cornell University Library, United States, Dec. 27, 2017, 361 pages, XP080848621.

* cited by examiner

VISUALIZING NETWORK TRAFFIC PLANS BASED ON EGRESS PEER ENGINEERING

BACKGROUND

Traffic engineering is a method of optimizing a performance of a network by dynamically analyzing, predicting, and regulating behavior of data transmitted over the network. Traffic engineering techniques can be applied to different types of networks, such as a packet optical network, a public switched telephone network (PSTN), a local area network (LAN), a wide area network (WAN), a cellular telephone network, the Internet, and/or the like. Egress peer engineering is a particular type of traffic engineering that directs traffic demands exiting a network to a peer operator network in a most cost effective way. Various factors may impact the effectiveness and cost of an egress peer engineering traffic plan, such as a cost to transport traffic demands across the network, a load on egress peer links, a cost of using the egress peer links, a cost to the peer operator network to forward traffic to a destination, and/or the like.

SUMMARY

According to some implementations, a method may include: receiving information related to a traffic flow to be transported through a network that includes a plurality of network devices that connect to one or more destination subnetworks through links interconnecting the plurality of network devices, wherein each respective link, of the links interconnecting the plurality of network devices, is associated with a cost function to assign traffic bandwidth to the respective link, and wherein the traffic flow includes a traffic bandwidth entering the network at a source network device, among the plurality of network devices, and to be transported to a target destination subnetwork among the one or more destination subnetworks; generating a traffic plan assigning the traffic flow to a set of the links that connect the source network device to the target destination subnetwork, wherein the set of links include a peer link connecting a first autonomous system to a second autonomous system, an external route connecting the second autonomous system to the target destination subnetwork, and a tunnel that directs traffic toward the peer link connecting the first autonomous system to the second autonomous system; and generating a visualization of the traffic plan that includes a set of objects to represent the set of links to which the traffic flow is assigned, wherein each object in the set of objects includes a first visual property based on the traffic bandwidth associated with the traffic flow and a second visual property based on the traffic bandwidth associated with the traffic flow and the cost function associated with a corresponding link in the set of links.

According to some implementations, a device may include one or more memories; and one or more processors, communicatively coupled to the one or more memories, to: receive information related to a plurality of traffic flows to be transported through a network that includes a plurality of network devices that connect to one or more destination subnetworks through links interconnecting the plurality of network devices, wherein each respective link, of the links interconnecting the plurality of network devices, is associated with a cost function to assign traffic bandwidth to the respective link; generate a starting traffic plan including an assignment of one or more of the plurality of traffic flows to a set of the links; receive information related to a modified traffic plan including one or more changes to the assignment of the one or more of the plurality of traffic flows; and render an animation to visualize one or more of an effect or a progress of applying the one or more changes to the assignment of the one or more of the plurality of traffic flows from the starting traffic plan to the modified traffic plan, wherein the animation depicts a set of objects that each includes a first visual property based on traffic bandwidths associated with the plurality of traffic flows and a second visual property based on the cost function associated with a corresponding link of the set of links and an amount of traffic bandwidth assigned to the corresponding link, and wherein rendering the animation causes one or more of the first visual property or the second visual property for one or more of the set of objects to change during the animation.

According to some implementations, a non-transitory computer-readable medium may store one or more instructions. The one or more instructions, when executed by one or more processors, may cause the one or more processors to: receive information related to a traffic flow to be transported through a network, wherein the traffic flow includes a traffic bandwidth to be transported through the network from a source to a destination; generate a traffic plan including an assignment of the traffic flow to a set of network resources that connect the source to the destination, wherein the set of network resources include a tunnel, a peer link, and an external route connecting the source to the destination; and render a visualization of the traffic plan that includes a set of objects to represent the set of network resources to which the traffic flow is assigned, wherein the visualization includes a user interface in which geometric shapes that represent the source, the peer link, and the destination are connected by bands that represent the tunnel and the external route, and wherein the geometric shapes and the bands each have a first visual property and a second visual property based on the traffic bandwidth of the traffic flow to be transported from the source to the destination.

DETAILED DESCRIPTION

Figure 1A:
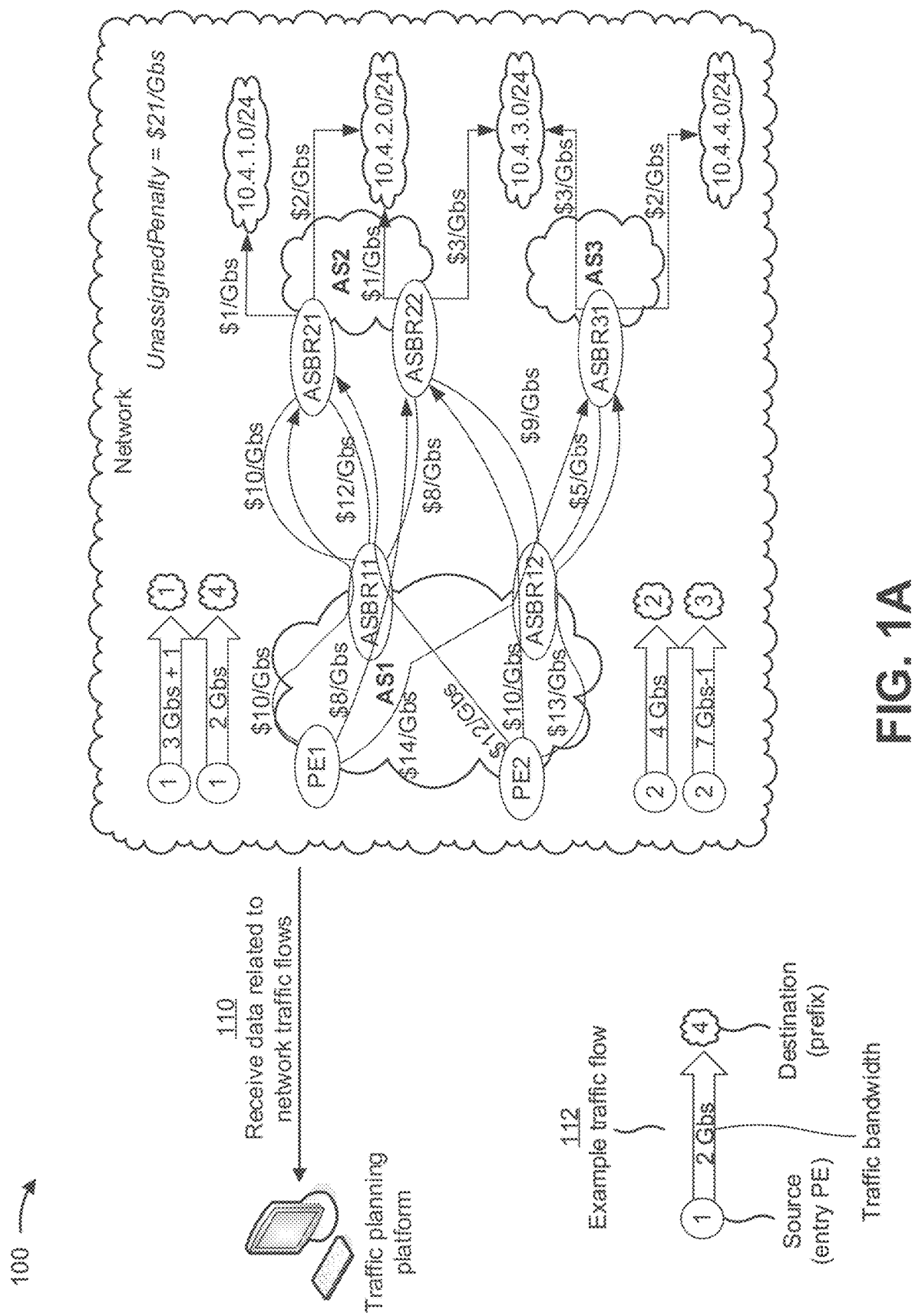
FIGS. 1A-1G are diagrams of one or more example implementations described herein.

The following detailed description of example implementations refers to the accompanying drawings. The same reference numbers in different drawings may identify the same or similar elements.

A network planning and design system may design a network that includes network devices (e.g., routers, switches, gateways, firewalls, and/or the like) and links provided between the network devices. Furthermore, in some cases, the network planning and design system may use traffic engineering to generate, determine, or otherwise a configure a traffic plan to transport one or more traffic flows through the network. However, in some cases (e.g., when the network has large quantities of network devices and/or links, when there are various traffic flows to be transported through the network, and/or the like), the network planning and design system may generate a traffic plan that is complex and difficult to visualize and understand. The time spent attempting to understand a complex traffic plan may cause the network planning and design system to overuse computing resources (e.g., processing resources, memory resources, and/or the like), inefficiently use networking resources (e.g., operating some links at less than capacity while other links are congested, routing certain traffic flows through slow or expensive links when faster and/or cheaper links are available), and/or the like. Furthermore, a suboptimal traffic plan that is not understood may still be implemented, which may waste computing resources, networking resources, and/or the like that are consumed creating the suboptimal traffic plan, correcting inefficient network operation caused by the suboptimal traffic plan, correcting inefficient use of network resources caused by the suboptimal traffic plan, and/or the like.

Some implementations described herein provide a traffic planning platform that may utilize egress peer engineering to determine a traffic plan for one or more traffic flows to be transported through a network and generate one or more visualizations that include various objects (e.g., geometric shapes and/or the like) with different visual properties (e.g., colors, dimensions, and/or the like) to represent information associated with a traffic plan, to represent or animate changes to a traffic plan, progress of applying a traffic plan, and/or the like. For example, the traffic planning platform may receive information related to a traffic flow to be transported through a network that includes a plurality of network devices that connect to one or more destination subnetworks through various links, and each of the links may be associated with a cost function to assign traffic bandwidth to the respective link. In some implementations, the traffic flow may include a traffic bandwidth that enters the network at a source network device and is to be transported to a destination subnetwork. The traffic planning platform may generate a traffic plan in which the traffic flow is assigned to a set of the links that connect the source network device to the destination subnetwork. For example, in some implementations, the set of links may include a peer link connecting a first autonomous system to a second autonomous system, an external route connecting the second autonomous system to the destination subnetwork, and a tunnel that directs traffic toward the peer link connecting the first autonomous system to the second autonomous system. Accordingly, the traffic planning platform may generate a visualization of the traffic plan that includes a set of objects to represent the set of links associated with the traffic flow, where each object includes a first visual property (e.g., a dimension such as a width, an area, a radius, a height, and/or the like) based on the traffic bandwidth associated with the traffic flow and a second visual property (e.g., a color) based on the traffic bandwidth associated with the traffic flow and the cost function associated with a corresponding link in the set of links.

In this way, the traffic planning platform may provide detailed user interfaces that enable a traffic plan, changes to a traffic plan (e.g., proposed changes, applied changes, and/or the like), and/or the like to be clearly understood, which reduces a likelihood that a suboptimal traffic plan will be implemented in the network, increases a likelihood that the traffic plan implemented in the network utilizes network resources efficiently and cost-effectively, and/or the like. This, in turn, conserves computing resources (e.g., processing resources, memory resources, and/or the like), networking resources, and/or the like that would otherwise be consumed identifying a suboptimal network plan, correcting inefficient network operation caused by the suboptimal network plan, correcting inefficient utilization of network resources caused by the suboptimal network plan, and/or the like.

FIGS. 1A-1G are diagrams of one or more example implementations 100 described herein. As shown in FIGS. 1A-1G, example implementation(s) 100 may include a network and a traffic planning platform that may generate a traffic plan to transport one or more traffic flows through the network, visualize the traffic plan and/or changes to the traffic plan, and/or the like. In some implementations, the network may include a packet optical network with multiple network devices and multiple links provided between the multiple network devices. In some implementations, the network may include a provider edge (PE) network that includes provider edge (PE) network devices, egress autonomous system border routers (ASBRs), peer links connecting the egress ASBRs to peer ASBRs, and destination subnetworks that are each associated with a prefix (e.g., a routing prefix that represents aggregated network addresses associated with a group of devices on the respective destination subnetwork), and/or the like.

For example, as shown in FIG. 1A, the network may include a first autonomous system (AS1) controlled by the traffic planning platform (e.g., and subject to egress peer engineering), a second autonomous system (AS2), and a third autonomous system (AS3). AS1 may include peer links with AS2 and AS3, and may include, for example, two PE network devices (e.g., PE1 and PE2) and two ASBRs (e.g., ASBR11 and ASBR12). AS2 may include two ASBRs (e.g., ASBR21 and ASBR22) and AS3 may include one ASBR (e.g., ASBR31). ASBR11 may include three peer links with AS2 (e.g., two peer links with ASBR21 and one peer link with ASBR22). ASBR12 may include one peer link with ASBR22 in AS2 and one peer link with ASBR31 in AS3. The peer links may include a capacity based on a particular data transfer rate (e.g., a quantity of gigabits (Gb) per second (Gb/s)).

In some implementations, links in the network may include one or more internal links or tunnels from PE network devices and egress ASBRs, one or more peer links between egress ASBRs and peer ASBRs, and one or more external routes from the peer ASBRs to the destination subnetworks. In general, as shown, each link may be associated with a cost function to transport traffic bandwidth over the corresponding link. For example, in FIG. 1A, the cost is illustrated as a linear cost function that indicates a dollar value per unit of traffic bandwidth (e.g., a quantity of dollars per Gb/s), where the cost can represent a financial cost or a normalized metric to represent a performance cost (e.g., a delay associated with a particular link). For example, a tunnel from PE1 to ASBR11 may be associated with a cost of $10 per Gb/s of traffic bandwidth transported over the tunnel, a peer link from ASBR11 to ASBR21 may be associated with a cost of $10 per Gb/s of traffic bandwidth transported over the peer link, and an external route from ASBR21 to a destination subnetwork associated with prefix 10.4.1.0/24 may be associated with a cost of $1 per Gb/s of traffic bandwidth. Accordingly, if a traffic flow associated with a traffic bandwidth of 2 Gb/s is transported from PE1 to prefix 10.4.1.0/24 via this route, the total cost would be $42. In general, linear functions for internal and external rates, penalties for unassigned traffic, piecewise linear functions for peering rates, and/or the like are examples of cost functions that may be implemented. In some implementations, other cost functions may be utilized for more sophisticated models (e.g., non-linear cost functions).

In the example illustrated in FIG. 1A, the network includes various prefixes (e.g., "10.4.1.0/24," "10.4.2.0/24," "10.4.3.0/24," and "10.4.4.0/24") that are in a traffic list for the PE network devices. For example, as mentioned above, each prefix may be associated with a particular destination subnetwork, where the particular notation shown in FIG. 1A includes Internet Protocol version 4 routing prefixes where "10.4.x.0" represents a starting address for a destination subnetwork and a value after the slash character "/" is a bit-length of the prefix. External transport rates (e.g., $1 per Gb/s, $2 per Gb/s, $1 per Gb/s, $3 per Gb/s, $3 per Gb/s, and $2 per Gb/s) between peer ASBRs and the prefixes may be indicated by arrows between a first prefix (e.g., 10.4.1.0/24) and ASBR21, between ASBR21 and a second prefix (e.g., 10.4.2.0/24), between the second prefix and ASBR22, between ASBR22 and a third prefix (e.g., 10.4.3.0/24), between the third prefix and ASBR31, between ASBR31 and a fourth prefix (e.g., 10.4.4.0/24), and/or the like. Furthermore, the network may include various transport routes from the PE network devices in the controlled autonomous system to peer autonomous systems that connect to the destination subnetworks. For example, in FIG. 1A, the network includes four tunnels from AS1 to AS2 and two tunnels from AS1 to AS3, as indicated by the arrows that start at the PE network devices in AS1 and point towards the peer ASBRs in AS2 and AS3.

As shown in FIG. 1A, and by reference number 110, the traffic planning platform may receive data related to one or more traffic flows to be transported through the network. For example, each traffic flow may arrive in the network at one of the PE network devices and have a certain traffic bandwidth to be transported through the network to a destination subnetwork associated with a particular prefix. For example, as shown by reference number 112, an example traffic flow may be visually represented by an arrow that corresponds to the traffic bandwidth to be transported through the network from a particular source (e.g., PE network device) to a particular destination (e.g., prefix associated with a subnetwork). For example, the example traffic flow shown by reference number 112 represents two (2) Gb/s of traffic that enters the network at PE1 on the left and is destined for the fourth prefix 10.4.4.0/24 on the right. Other traffic flows shown in FIG. 1A include three (3) Gb/s of traffic that enters the network at PE1 and is destined for the first prefix 10.4.1.0/24, four (4) Gb/s of traffic that enters the network at PE2 and is destined for the second prefix 10.4.2.0/24, and seven (7) Gb/s of traffic that enters the network at PE2 and is destined for the third prefix 10.4.3.0/24. Furthermore, as shown, the traffic to be transported from PE1 to the first prefix may be value biased up by one (e.g., indicated by the notation "+1", which may indicate traffic that requires a higher quality of service), and traffic to be transported from PE2 to the third prefix may be value biased down by one (e.g., indicated by the notation "−1", which may indicate traffic that requires a lower quality of service). Furthermore, in some implementations, an unassigned traffic penalty may be defined to indicate a particular value (e.g., $21 per Gb/s) for traffic flows that are not assigned to a transport route through the network.

Figure 1B:
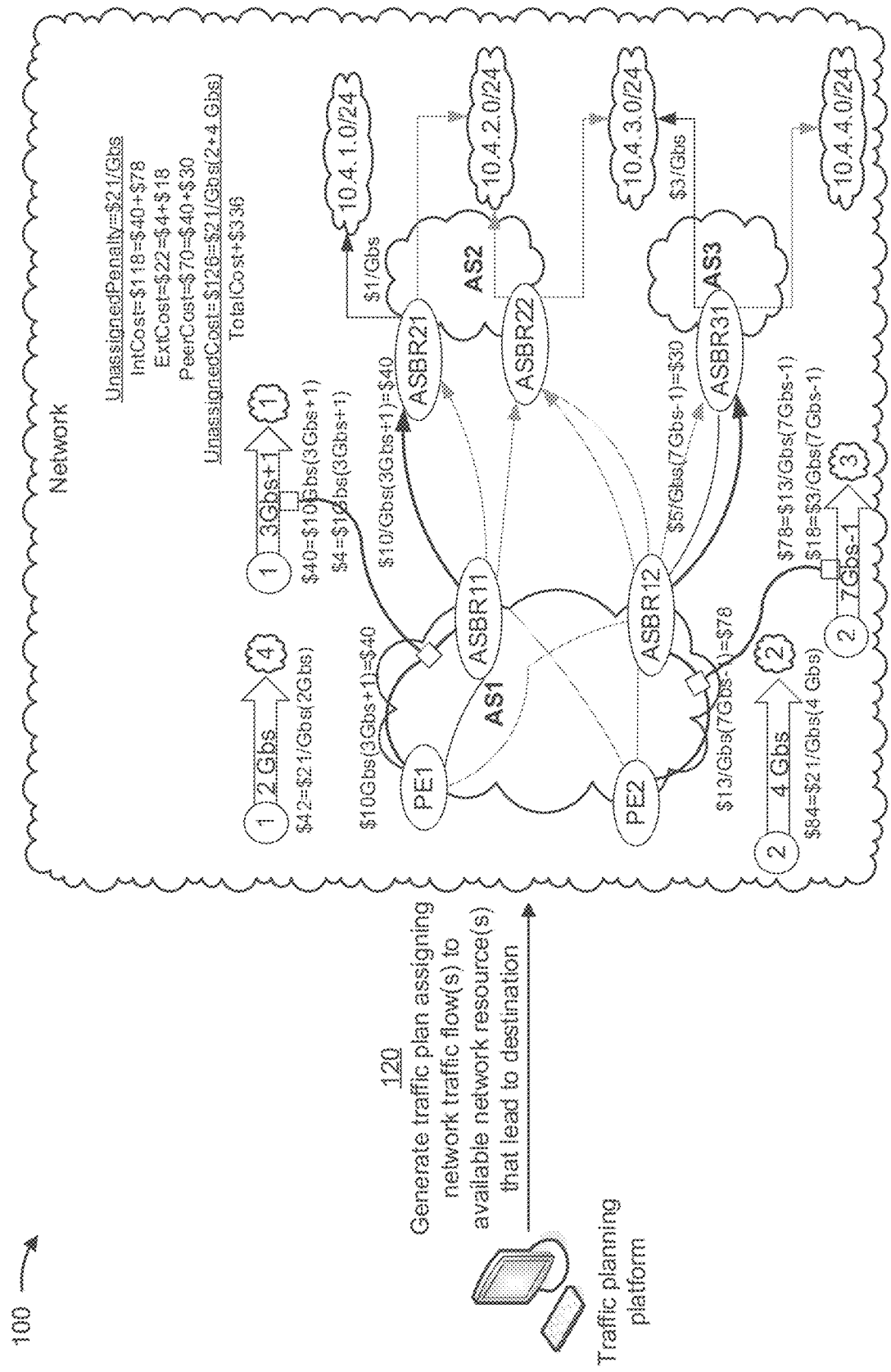

As shown in FIG. 1B, and by reference number 120, the traffic planning platform may generate a traffic plan assigning traffic flows to be transported through the network to one or more available network resources that lead to the destination associated with the respective traffic flows. For example, the traffic flows may be assigned to the available network resources based on optimization objectives, such as minimizing a transport cost, minimizing a transport latency, avoiding congestion or bottlenecks, and/or the like. As described herein, the network resources to which the traffic plan can be assigned may generally include one or more source network devices, tunnels, peer links, external routes, destination prefixes, nodes, paths, and/or the like. Accordingly, in some implementations, the traffic planning platform may be operated to steer the traffic flows arriving at the PE network devices in AS1 into tunnels that direct the traffic flows towards peer links that connect to the appropriate destinations of the traffic flows (e.g., tunnels that direct the traffic flows to peer links that connect to a peer AS that can reach the correct destination). For example, in FIG. 1B, links between ASBRs in AS1 and peer ASBRs in AS2 and AS3 may represent peer links, which are associated with a peer cost, arrows from PEs in AS1 to the peer ASBRs in AS2 and AS3 represent tunnels available for transporting traffic from a PE network device to a specific peer link, which are associated with an internal cost, and arrows from the peer ASBRs in AS2 and AS3 to the destination subnetworks represent external routes in the peer autonomous systems to prefixes associated with the destination subnetworks, which are associated with an external cost.

Accordingly, in the illustrated example, network resources associated with each transport route from a particular PE network device to a particular prefix associated with a destination subnetwork may include an internal tunnel from the particular PE network device to an egress ASBR (e.g., ASBR11 or ASBR12), a peer link from the egress ASBR to a peer ASBR, and an external route from the peer ASBR to the particular prefix associated with the destination subnetwork. In general, in order to assign a particular traffic flow to a particular network resource (e.g., an internal tunnel), the particular network resource has to lead to another network resource (e.g., a peer ASBR) that can reach the destination prefix associated with the traffic flow. Furthermore, each network resource (e.g., tunnel, peer link, external route, and/or the like) may be associated with a cost function of assigning traffic bandwidth to the associated network resources, and the unassigned penalty may represent a cost for traffic bandwidth that is not steered into a particular tunnel and therefore receives un-engineered (e.g., best effort) quality of service on a best Interior Gateway Protocol (IGP) route available in the autonomous system. Accordingly, in some implementations, the traffic plan may generally include a set of assignments, a set of non-assignments, and/or the like for each traffic flow arriving in the network. In general, each traffic flow may be automatically assigned to a source (e.g., the PE network device where the traffic flow originates) and a destination (e.g., prefix associated with a destination subnetwork where the traffic flow terminates), and the traffic planning platform can be used to assign (or reassign) the traffic flow to one or more network resources between the source and the destination.

For example, in the traffic plan illustrated in FIG. 1B, a first traffic flow to be transported from PE1 to the first prefix has been assigned to the tunnel leading from PE1 into ASBR11, which leads to a peer link connecting ASBR11 to ASBR21 in AS2, which connects to the first prefix via an external route. In this case, the first traffic flow has a traffic bandwidth of 3 Gb/s, which is value biased up by 1, whereby the first traffic flow is associated with an internal cost (IntCost) of $40 ($10 per Gb/s) for transport via the tunnel leading from PE1 into ASBR11, a peer cost (PeerCost) of $40 ($10 per Gb/s) for transport via the peer link connecting ASBR11 to ASBR21, and an external cost (ExtCost) of $4 ($1 per Gb/s) for transport via the external route that connects to the first prefix. Furthermore, a second traffic flow to be transported from PE2 to the third prefix has been assigned to the tunnel leading from PE2 into ASBR12, which leads to a peer link connecting ASBR12 to ASBR31 in AS3, which connects to the third prefix via an external route. In this case, the second traffic flow has a traffic bandwidth of 7 Gb/s, which is value biased down by 1, whereby the second traffic flow is associated with an internal cost of $78 ($13 per Gb/s) for transport via the tunnel leading from PE2 into ASBR12, a peer cost of $30 ($5 per Gb/s) for transport via the peer link connecting ASBR12 to ASBR31, and an external cost of $18 ($3 per Gb/s) for transport via the external route that connects to the third prefix. Furthermore, a third traffic flow to be transported from PE1 to the fourth prefix and a fourth traffic flow to be transported from PE2 to the second prefix are unassigned and thus associated with an unassigned cost based on the unassigned penalty for traffic bandwidth that is not assigned to a particular transport route, resulting in a total unassigned cost of $126 (based on the unassigned penalty of $21 per Gb/s multiplied by the 2 Gb/s traffic bandwidth of the third traffic flow and the 4 Gb/s traffic bandwidth of the fourth traffic flow). In this example, a total cost for the assignments of the first and second traffic flows and penalties for the non-assignments of the third and fourth traffic flows amounts to $336.

Figure 1C:
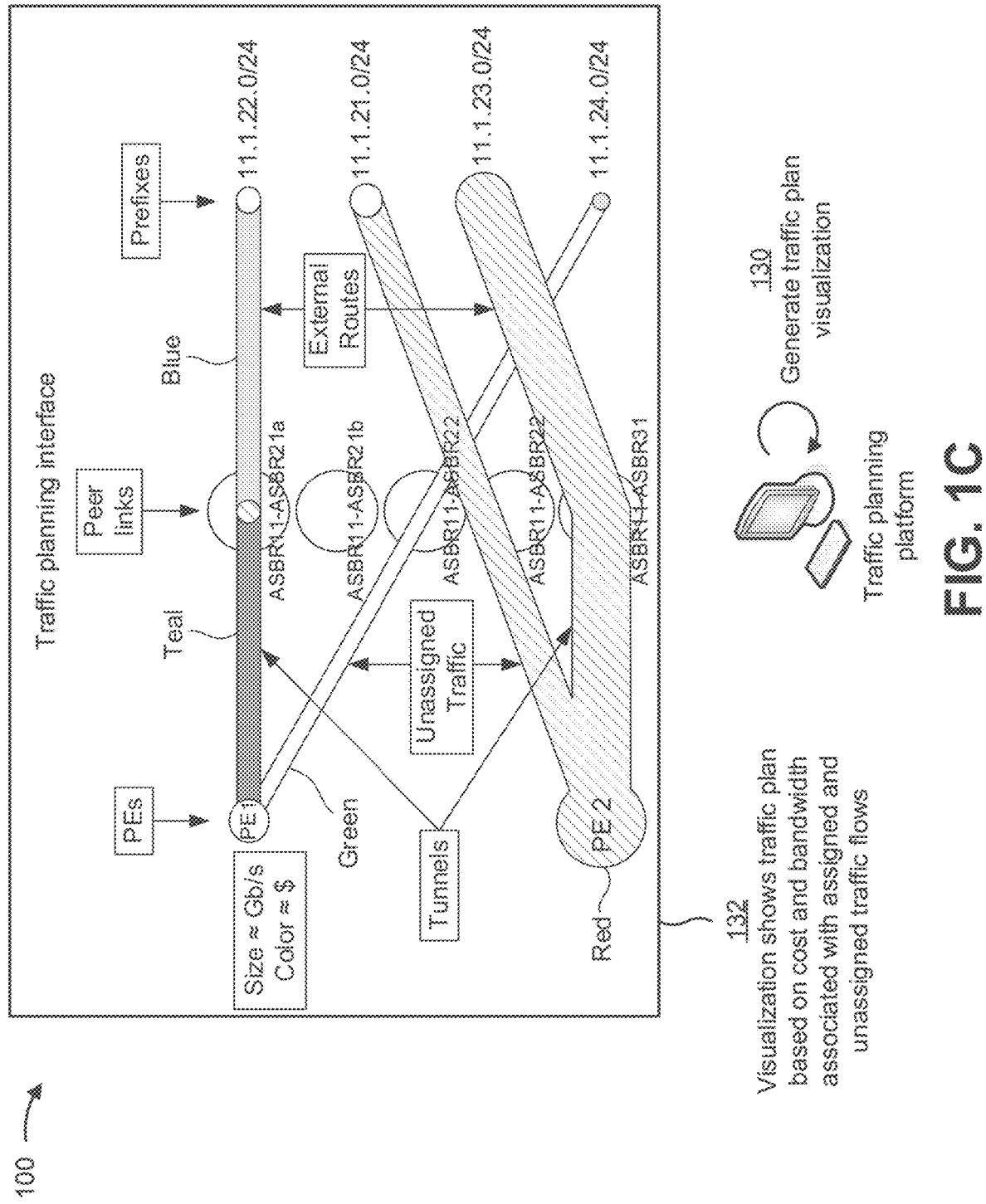

As shown in FIG. 1C, and by reference number 130, the traffic planning platform may generate a visualization of the traffic plan. For example, as shown by reference number 132, the visualization includes one or more objects to represent the traffic plan based on a cost and a bandwidth associated with the assigned and unassigned traffic flows. In particular, in FIG. 1C, the one or more objects may include various geometric shapes to represent the PE network devices, the peer links between egress ASBRs and peer ASBRs, the destination prefixes, the tunnels that lead from the PE network devices into the peer links, and the external routes that connect the peer ABSRs to the destination prefixes. For example, in FIG. 1C, the geometric shapes include circles to represent traffic assigned to the PE network devices, the peer links, and the destination prefixes and lines to represent the tunnels, external routes, and unassigned traffic flows. In some implementations, other suitable geometric shapes can be used. Furthermore, the visualization of the traffic plan may use different visual properties to represent costs and traffic bandwidths. For example, as described herein, the visual properties may include colors to denote costs and a variable size or dimension for the objects to represent traffic bandwidth.

For example, in some implementations, the costs may be represented in a color continuum (e.g., with blue representing a low cost, green representing a medium cost, and red representing a high cost, with other colors within the continuum representing intermediate costs, such as teal representing a medium-low cost). In FIG. 1C, the different colors in the color continuum are shown using different fill patterns (e.g., solid white to represent green, diagonal lines to represent red, light gray to represent blue, dark gray to represent teal, and/or the like). Furthermore, the variable sizes or dimensions for the objects in the visualization of the traffic plan may be proportional to the traffic bandwidth associated with the corresponding object. For example, areas of the circles representing the PE network devices may be proportional to the traffic bandwidth entering the corresponding PE network devices (e.g., in the illustrated example, there is 11 Gb/s of traffic entering PE2 and 5 Gb/s of traffic entering PE1, whereby the circle representing PE2 has an area that is more than double the area of the circle representing PE1). In a similar respect, areas of the dots overlaid on the circles representing the peer links and the circles that represent the destination prefixes may be proportional to the traffic bandwidth assigned to the peer links and traffic bandwidth targeted to the destination prefixes, respectively. Furthermore, the circles representing the peer links may have areas that are proportional to the capacity of the peer link, whereby the visualization may depict whether a peer link is overloaded. For example, a peer link may be overloaded if the dot that represents traffic assigned to the peer link has a larger area than the circle that represents the capacity of the peer link. Additionally, or alternatively, the peer link may have capacity to handle more traffic if the dot that represents the assigned traffic has an area that is smaller than the circle representing the capacity of the peer link. Furthermore, the lines that represent the tunnels, the external routes, and the unassigned traffic may have widths that are proportional to the traffic bandwidth associated therewith.

Accordingly, in the visualization of the traffic plan, each object may have a first visual property (e.g., a dimension, such as a width, an area, a radius, and/or the like) that is based on the traffic bandwidth to be transported through the corresponding object and a second visual property (e.g., a color within a continuum, such as from blue to red, from white to black, and/or the like) that represents a cost to transport the traffic bandwidth assigned to the corresponding object (e.g., based on the traffic bandwidth to be transported through the corresponding object and a cost function associated with the corresponding object).

Figure 1D:
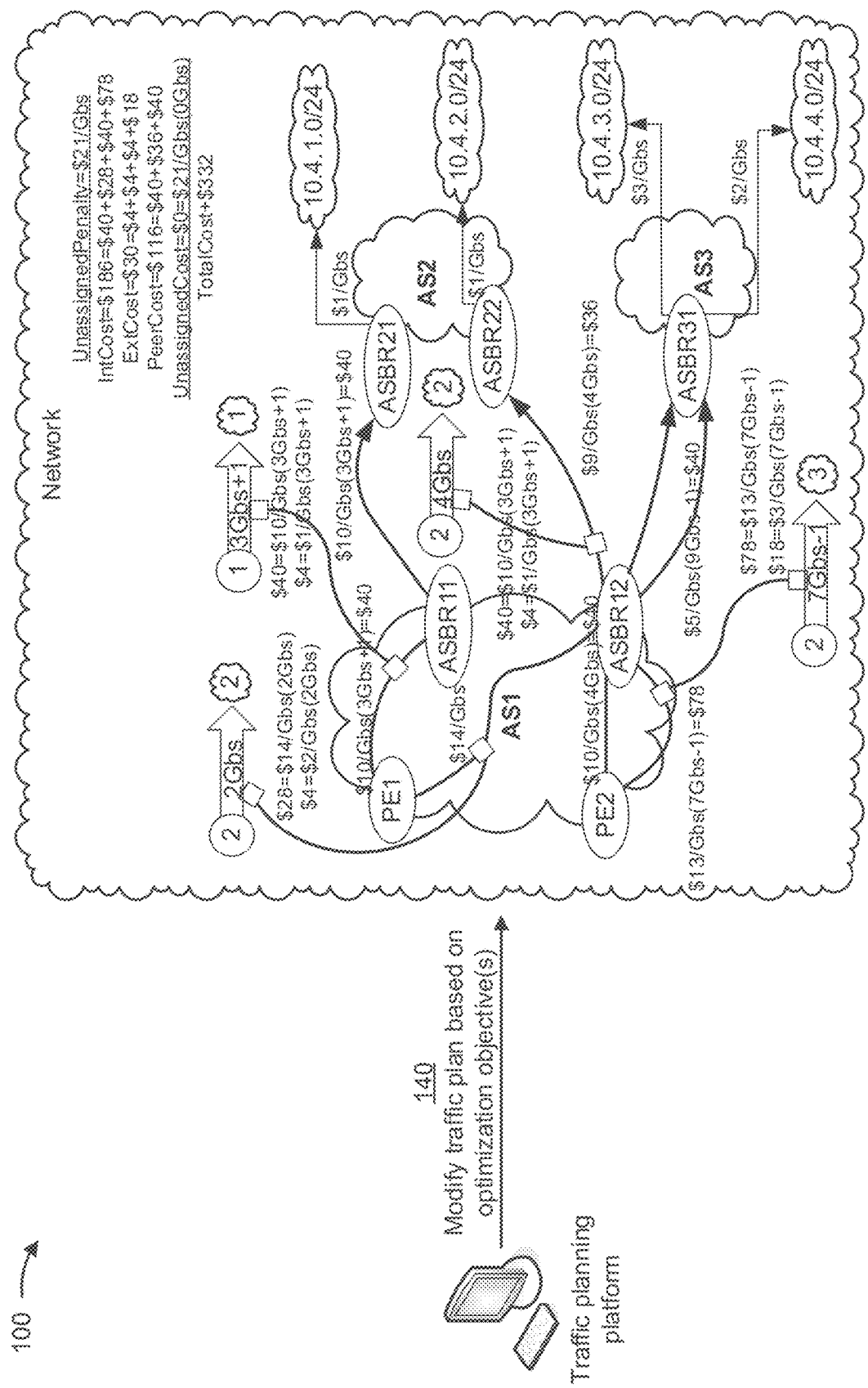

As shown in FIG. 1D, and by reference number 140, the traffic planning platform may be configured to modify the traffic plan based on one or more optimization objectives. For example, in some implementations, the one or more optimization objectives may include an objective to improve (e.g., reduce) a total cost associated with transporting the traffic flows through the network, to minimize disruption in the network (e.g., avoiding a need to reconfigure the network, minimizing congestion in the peer links, and/or the like), to assign all traffic flows to an appropriate tunnel, peer link, external route, and/or the like, and/or the like. Accordingly, in some implementations, the traffic plan may be modified by implementing one or more changes to the existing traffic plan, which may include moving one or more traffic flows from one tunnel to another, from one peer link to another, from one external route to another, from an assigned to an unassigned state, from an unassigned state to an assigned state, and/or the like.

In the example illustrated in FIG. 1D, the traffic plan has been modified to assign the previously unassigned traffic flow that includes 2 Gb/s of traffic bandwidth to be transported from PE1 to the fourth prefix (e.g., 10.4.4.0/24) to an appropriate tunnel leading to a peer link that can reach the fourth prefix (e.g., the tunnel from PE1 to ASBR12, thus steering the traffic flow into the peer link between ASBR12 and ASBR31 that connects to the fourth prefix). In addition, the traffic plan has been modified to assign the previously unassigned traffic flow that includes 4 Gb/s of traffic bandwidth to be transported from PE2 to the second prefix (e.g., 10.4.2.0/24) to a tunnel leading to a peer link that can reach the second prefix (e.g., the tunnel from PE2 to ASBR12, thus steering the traffic flow into the peer link between ASBR12 and ASBR22 that connects to the second prefix). In this case, the one or more changes implemented in the traffic plan may reduce the total transport cost (e.g., from $336 to $332). Furthermore, in some implementations, the total cost of the modified traffic plan may be further reduced, for example, by not assigning the traffic flow from PE1 to the fourth prefix since the unassigned traffic penalty associated with this traffic is less than a cost associated with assigning this traffic.

Figure 1E:
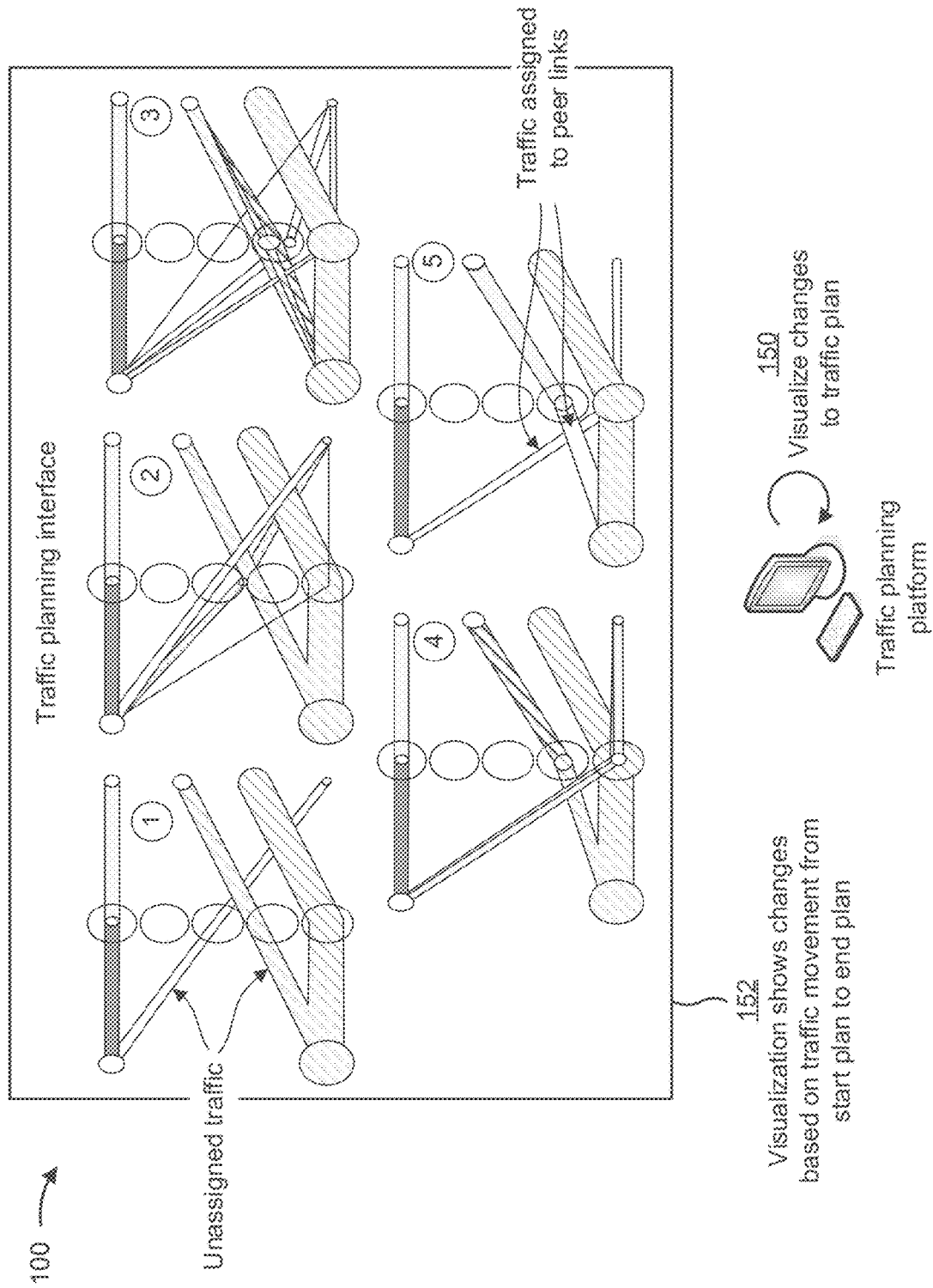

As shown in FIG. 1E, and by reference number 150, the traffic planning platform may generate a visualization that depicts the changes implemented to the traffic plan. For example, in some implementations, the visualization may individually depict the initial or starting traffic plan, the modified traffic plan, one or more intermediate or other modified traffic plans, and/or the like in a similar manner as shown in FIG. 1C. Additionally, or alternatively, the visualization may include an animation to depict an effect from implementing the one or more changes. For example, as shown by reference number 152, the visualization may show the changes based on traffic movement from the starting traffic plan to an ending traffic plan. In the illustrated example, the visualization may initially show the starting traffic plan (depicted in the upper left-hand corner), which is generally similar to the visualization shown in FIG. 1C. Furthermore, the ending traffic plan (depicted in the lower right hand-corner), which is generally based on the modified traffic plan shown in FIG. 1D (e.g., where the two unassigned traffic flows have been assigned to tunnels, peer links, and external routes).

Accordingly, in some implementations, the animation may progress through one or more intermediate states to visualize differences or otherwise present information that indicates an effect from the one or more changes to the traffic plan from the starting traffic plan to the ending traffic plan. For example, in FIG. 1E, the starting traffic plan is labelled '1', the ending traffic plan is labelled '5', and there are three intermediate states labelled '2', '3', and '4'. In some implementations, the animation may represent moving traffic flows (e.g., changing an assignment for a traffic flow from assigned to unassigned, from unassigned to assigned, from one tunnel to another, from one peer link to another, from one external route to another, and/or the like) by dots moving on a path from an old assignment (or unassigned state) to a new assignment (or unassigned state). Furthermore, the dots that represent the moving traffic flows may be associated with pivoting lines that connect the traffic flow with the associated source network device (e.g., PE network device) on the left, the associated peer link in the middle, and the associated destination prefix on the right. In some implementations, moving objects in the animated visualization may have a first visual property (e.g., color) to represent a cost that is based on the bandwidth of the traffic flow and the cost function of the corresponding object, and moving objects may also have a second visual property (e.g., size, dimension, and/or the like) to represent the bandwidth of the traffic flow. Furthermore, visual properties for objects that are affected by the changes to the traffic plan (e.g., a PE network device, tunnel, peer link, external route, prefix, unassigned traffic line, and/or the like to which bandwidth is added and/or removed) may be animated to show the effect of the changes, progress of applying the changes, and/or the like. For example, geometric shapes such as the circles representing PE network devices, the peer links, the external routes, and/or the like and geometric shapes such as the lines representing tunnels, external routes, and/or the like may change color, transition in size, and/or the like to indicate changes in values from the starting traffic plan to the ending traffic plan.

Figure 1F:
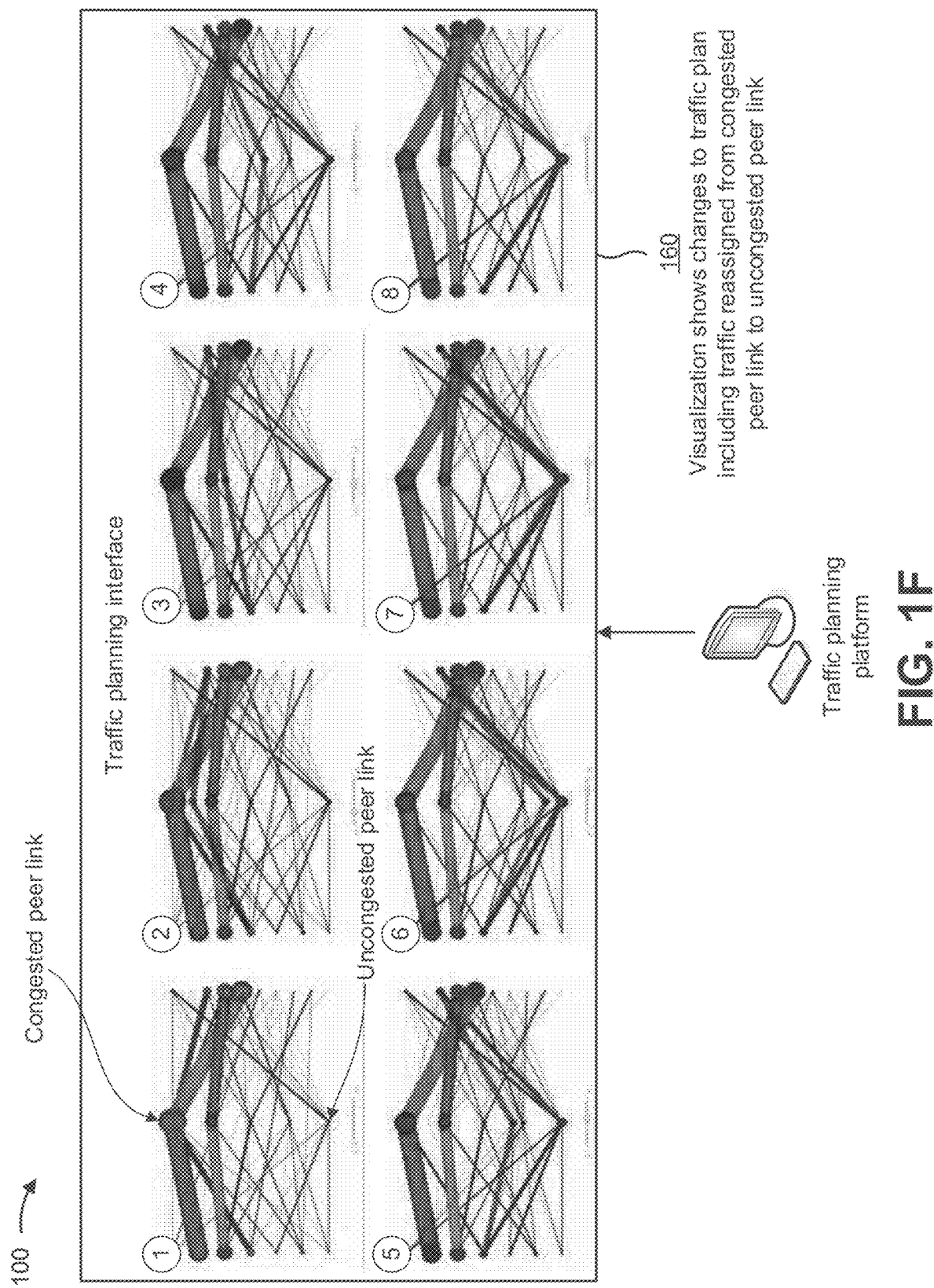

In another example, as shown in FIG. 1F, and by reference number 160, a visualization may animate more complex changes to a traffic plan, including reassignment of one or more traffic flows from a congested (or overloaded) peer link to an uncongested peer link. For example, in the example illustrated in FIG. 1F, a dot representing traffic assigned to the congested peer link is overlaid on the circle representing the capacity of the peer link. In this case, the dot representing the traffic assigned to the congested peer link is larger than the circle representing the capacity of the peer link, indicating that the peer link is overloaded. Accordingly, in the visualization shown in FIG. 1F, one or more traffic flows are reassigned from the congested peer link to another suitable peer link that can reach the intended destination of the reassigned traffic flows to alleviate a burden on the congested peer link. In a similar manner as described above, shapes representing changing PE network devices, tunnels, peer links, external routes, prefixes, and unassigned traffic lines may change in color and transition in size from values in the starting traffic plan to the ending traffic plan. For example, in FIG. 1F, there are eight visualizations to show traffic flows moving together from a common starting traffic plan (the traffic plan labelled '1') to a common ending traffic plan (the traffic plan labelled '8'). Accordingly, dots, lines, and/or the like may increase and/or decrease in size in proportion to traffic bandwidth that is assigned to and/or unassigned from the corresponding object, and colors of the dots, lines, and/or the like may change to indicate a change in cost based on the traffic bandwidth assigned to and/or unassigned from the corresponding object as well as the cost function associated with the corresponding object.

Figure 1G:
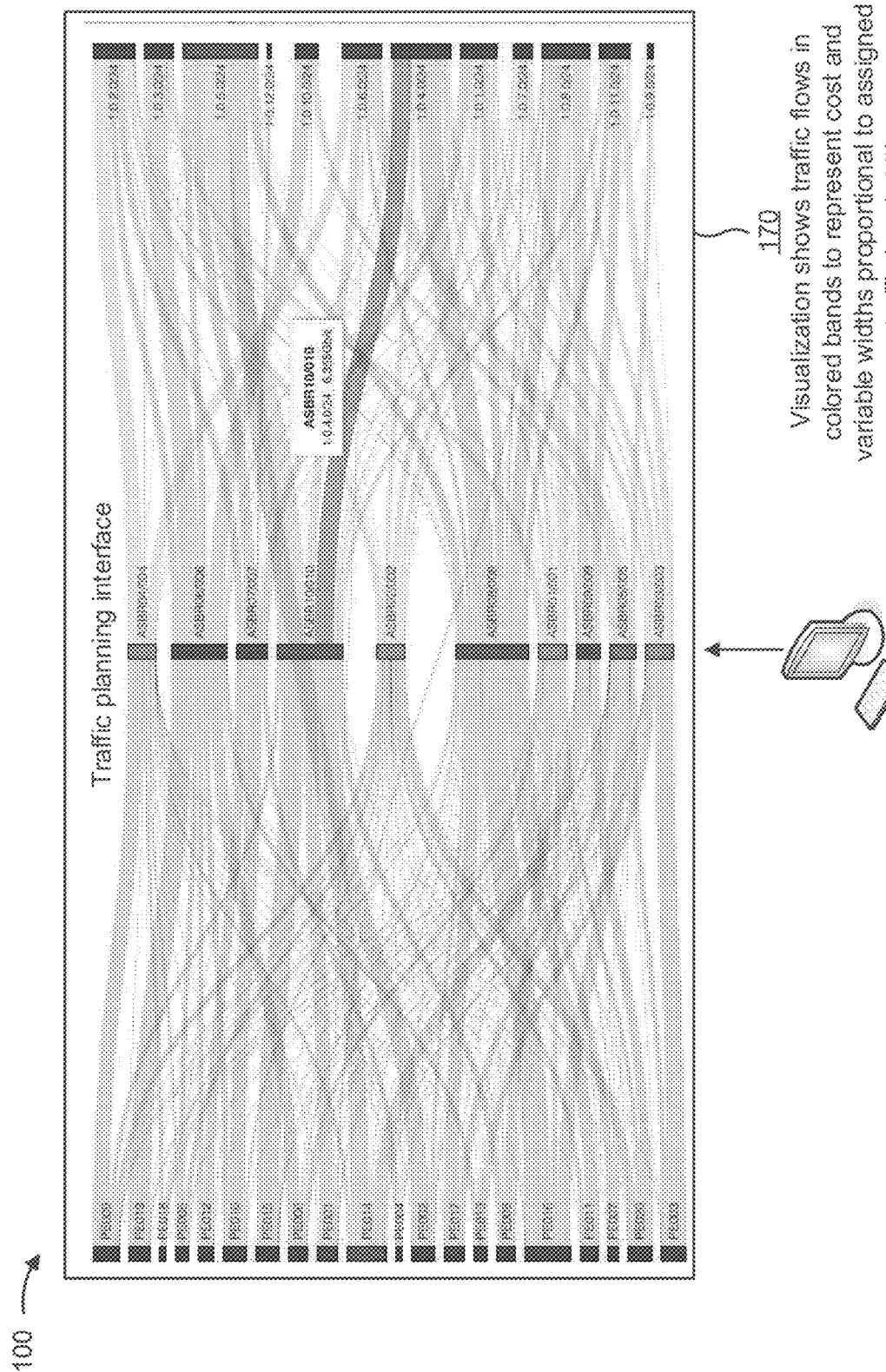

As shown in FIG. 1G, and by reference number 170, the visualization may take the form of a diagram, such as a Sankey diagram, an alluvial diagram, and/or the like, which shows traffic flows in bands (sometimes referred to as "swim lanes", "stream fields", and/or the like) to tunnels and external routes. In some implementations, the bands may each have a color to represent a cost associated with traffic flows to be transported via the tunnels and/or external routes, and the colored bands may also have variable widths that are proportional to traffic bandwidth to be transported via the corresponding tunnels and/or external routes. Furthermore, as shown, PE network devices, peer links, and destination prefixes may be represented by corresponding geometric objects, which are blocks in the illustrated example. Accordingly, the blocks that represent the PE network devices (on the left-hand side), the peer links (in the middle), and the destination prefixes (on the right-hand side) may have one or more dimensions (e.g., a height or width) that are proportional or otherwise based on the traffic bandwidth entering, passing through, or destined for the corresponding block. Furthermore, the blocks may also be associated with a color within a continuum to represent the cost of transporting the traffic bandwidth through the associated tunnel, peer link, external route, and/or the like.

In some implementations, the traffic planning platform may receive one or more requests to trace information presented in the various visualizations described herein. For example, the traffic planning platform may receive a request to filter the visualization to present information related to only certain traffic flows, certain peer links, certain PE network devices, certain tunnels, and/or the like. In another example, the traffic planning platform may receive a request to filter the visualization to exclude information related to certain traffic flows, certain peer links, certain PE network devices, certain tunnels, and/or the like. In still another example, may receive a query that provides one or more criteria for filtering or otherwise tracing a status of information presented in the visualization(s). For example, an operator may indicate values for a cost or cost range, a traffic bandwidth, and/or the like, and the visualization(s) may be configured to present information related to a status of one or more objects that satisfy the criteria. In still another example, the operator may select an object in the visualization(s), which may present information related to a status of the selected object. For example, in FIG. 1G, an operator may select the band connecting peer link ASBR10/010 to destination prefix 1.0.4.0/24, which may generally correspond to an external route connecting peer link ASBR10/010 to destination prefix 1.0.4.0/24, and the visualization may present information related to the status of the external route (e.g., that the external route is currently carrying 6.355 Gb/s of traffic). In other examples, the visualization may further information related to a cost to transport traffic over a particular tunnel, peer link, external route, and/or the like.

As indicated above, FIGS. 1A-1G are provided merely as one or more examples. Other examples may differ from what is described with regard to FIGS. 1A-1G. For example, in addition to generating visualizations to help understand a traffic plan and/or changes to a traffic plan, the visualizations may include one or more interactive elements to enable an operator to manually and/or automatically propose and/or apply changes to the current traffic plan, and the various interfaces of the traffic planning platform may be used to implement traffic plans, modified traffic plans, and/or the like in the network. For example, in some implementations, the one or more interactive elements may include the various objects that are used to represent network devices, tunnels, peer links, external routes, and/or the like that are used to transport traffic flows through the network as well as the traffic flows to be transported through the network. Accordingly, the operator may select one or more of the interactive elements to move a traffic flow from one peer link to another, from one tunnel to another, and/or the like in order to explore possible ways to improve operation of the network (e.g., by reducing total cost, assigning all traffic flows, alleviating congestions, and/or the like). In other examples, the one or more interactive elements may include one or more buttons or other suitable user interface elements that can be selected to initiate an automated process whereby the traffic planning platform identifies possible changes to the traffic plan, which may be automatically implemented in the network, presented to the operator to allow the operator to choose an optimal traffic plan from among the current traffic plan and one or more traffic plan including changes to the current traffic plan, and/or the like. In addition, when a particular traffic plan is to be implemented in the network, the traffic planning platform may assign traffic flows to tunnels and/or peer links based on the visualization(s) (e.g., based on the operator selecting an option to implement a traffic plan shown in a particular visualization), and the network devices and the links of the network may implement the traffic flow assignments. In some implementations, the traffic planning platform may cause a traffic plan to be implemented in the network by providing, to one or more of the network devices, instructions indicating that the one or more network devices, and the links associated with the one or more network devices, are to implement the traffic plan. The one or more network devices may receive the instructions and may implement the traffic plan based on the instructions. For example, the traffic planning device may provide, to three network devices (e.g., a PE network device, an internal ABSR, and a peer ASBR), instructions indicating that the three network devices (e.g., and two links provided between the three network devices, including a tunnel and a peer link) are to assign particular traffic flow to a particular tunnel. The three network devices may receive the instructions and may assign the particular traffic flow to the particular tunnel based on the instructions.

Figure 2:
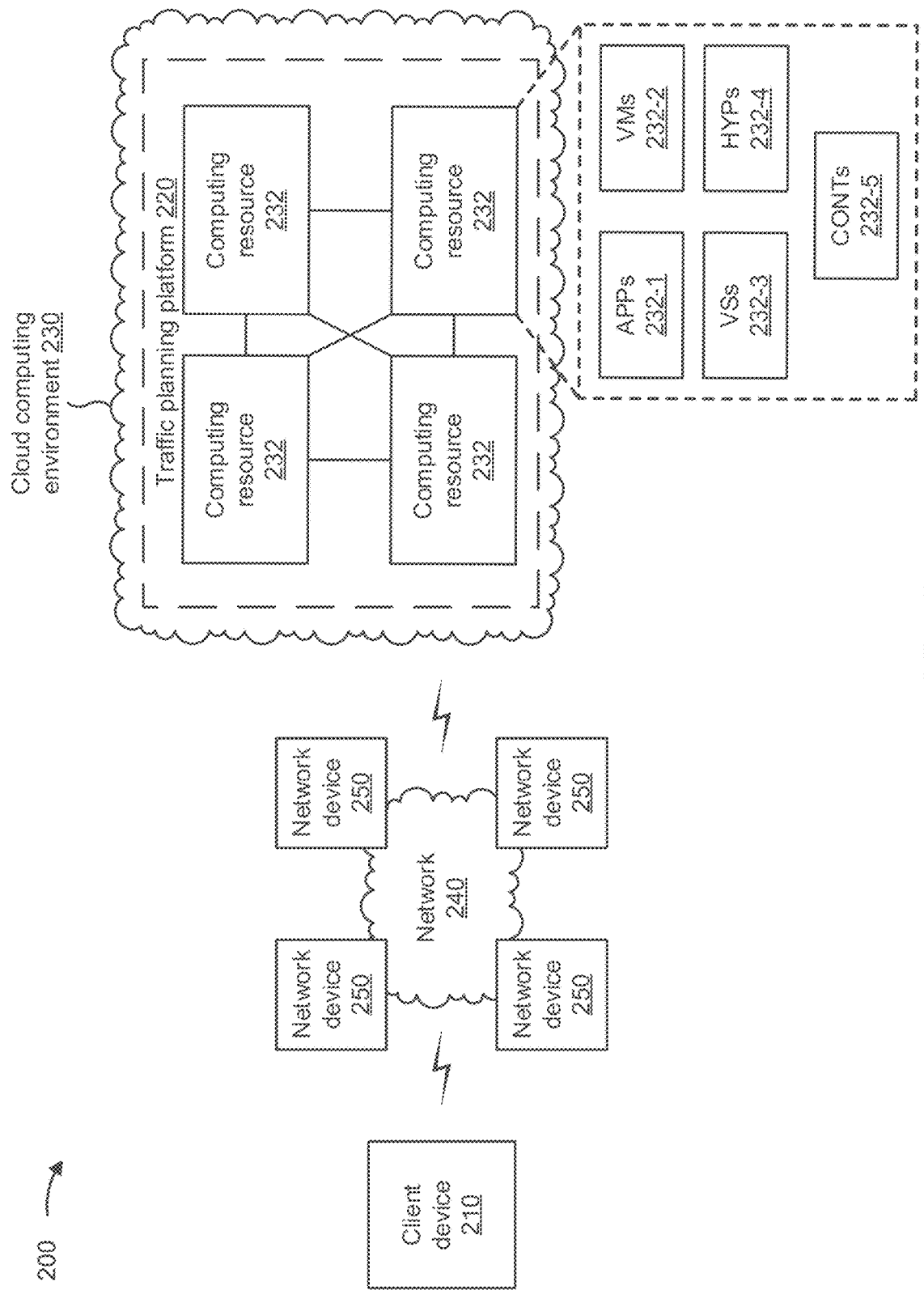
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a traffic planning platform 220 hosted in a cloud computing environment 230 including a set of computing resources 232, a network 240, and a group of network devices 250 associated with network 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to traffic planning platform 220, via network 240 and/or network devices 250. In some implementations, client device 210 may receive network traffic from and/or may provide network traffic to other client devices 210 via network 240 (e.g., by routing packets using network devices 250 as intermediaries).

Traffic planning platform 220 includes one or more devices that utilize egress peer engineering to generate or otherwise determine a traffic plan for a set of traffic flows to be transported through a network (e.g., network 240) and to implement the traffic plan in the network. Furthermore, in some implementations, traffic planning platform 220 is configured to generate one or more visualizations of the traffic plan, such as a diagram (e.g., a Sankey diagram, an alluvial diagram, and/or the like) in which geometric shapes that represent information related to the traffic plan have visual properties based on a cost, a traffic bandwidth, and/or the like for the set of traffic flows to be transported through the network. In some implementations, traffic planning platform 220 can be further configured to propose, apply, and/or implement one or more changes to the traffic plan, and the one or more visualizations of the traffic plan can be generated to present an effect from the one or more changes (e.g., in an animation in which the visual properties based on cost, traffic bandwidth, and/or the like change over time to indicate a change from a starting traffic plan to an ending traffic plan, progress of applying changes from the starting traffic plan to the ending traffic plan, and/or the like).

In some implementations, traffic planning platform 220 may be designed to be modular such that certain software components may be swapped in or out depending on a particular need. Accordingly, traffic planning platform 220 may be easily and/or quickly reconfigured for different uses. In some implementations, traffic planning platform 220 may receive information from and/or transmit information to one or more client devices 210 and/or network devices 250. In some implementations, as shown, traffic planning platform 220 may be hosted in cloud computing environment 230. Notably, while implementations described herein describe traffic planning platform 220 as being hosted in cloud computing environment 230, in some implementations, traffic planning platform 220 may not be cloud-based (i.e., may be implemented outside of a cloud computing environment) or may be partially cloud-based.

Cloud computing environment 230 includes an environment that hosts traffic planning platform 220. Cloud computing environment 230 may provide computation, software, data access, storage, and/or the like, services that do not require end-user knowledge of a physical location and configuration of system(s) and/or device(s) that hosts traffic planning platform 220. As shown, cloud computing environment 230 may include a group of computing resources 232 (referred to collectively as "computing resources 232" and individually as "computing resource 232").

Computing resource 232 includes one or more personal computers, workstation computers, mainframe devices, or other types of computation and/or communication devices. In some implementations, computing resource 232 may host traffic planning platform 220. The cloud resources may include compute instances executing in computing resource 232, storage devices provided in computing resource 232, data transfer devices provided by computing resource 232, and/or the like. In some implementations, computing resource 232 may communicate with other computing resources 232 via wired connections, wireless connections, or a combination of wired and wireless connections.

As further shown in FIG. 2, computing resource 232 includes a group of cloud resources, such as one or more applications ("APPs") 232-1, one or more virtual machines ("VMs") 232-2, virtualized storage ("VSs") 232-3, one or more hypervisors ("HYPs") 232-4, one or more containers ("CONTs") 232-5, and/or the like.

Application 232-1 includes one or more software applications that may be provided to or accessed by client device 210. Application 232-1 may eliminate a need to install and execute the software applications on client device 210 and/or network devices 250. For example, application 232-1 may include software associated with traffic planning platform 220 and/or any other software capable of being provided via cloud computing environment 230. In some implementations, one application 232-1 may send/receive information to/from one or more other applications 232-1, via virtual machine 232-2.

Virtual machine 232-2 includes a software implementation of a machine (e.g., a computer) that executes programs like a physical machine. Virtual machine 232-2 may be either a system virtual machine or a process virtual machine, depending upon use and degree of correspondence to any real machine by virtual machine 232-2. A system virtual machine may provide a complete system platform that supports execution of a complete operating system ("OS"). A process virtual machine may execute a single program and may support a single process. In some implementations, virtual machine 232-2 may execute on behalf of a user (e.g., a user of client device 210 or an operator of traffic planning platform 220), and may manage infrastructure of cloud computing environment 230, such as data management, synchronization, or long-duration data transfers.

Virtualized storage 232-3 includes one or more storage systems and/or one or more devices that use virtualization techniques within the storage systems or devices of computing resource 232. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 232-4 may provide hardware virtualization techniques that allow multiple operating systems (e.g., "guest operating systems") to execute concurrently on a host computer, such as computing resource 232. Hypervisor 232-4 may present a virtual operating platform to the guest operating systems and may manage the execution of the guest operating systems. Multiple instances of a variety of operating systems may share virtualized hardware resources.

Container 232-5 includes a self-contained execution environment (e.g., an isolated user space instance based on virtualization at an operating system level, an application level, and/or the like). In some implementations, container 232-5 may be a multi-platform based, open source software package that encapsulates a virtual platform for executing one or more applications (e.g., application 232-1). For example, the encapsulation may include a filesystem with code, a runtime system, system tools, libraries, and/or other resources assigned to container 232-5 by an underlying operating system. While FIG. 2 illustrates container 232-5 operating in cloud computing environment 230, in some implementations, container 232-5 can operate in non-cloud environments and/or other virtualization environments.

Network 240 includes one or more wired and/or wireless networks. For example, network 240 may include a cellular network (e.g., a fifth generation (5G) network, a long-term evolution (LTE) network, a third generation (3G) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), an autonomous system, a subnetwork, a private network, an ad hoc network, an intranet, the Internet, a fiber optic-based network, and/or the like, and/or a combination of these or other types of networks.

Network device 250 includes one or more devices capable of receiving, processing, storing, routing, and/or providing traffic (e.g., a packet, other information or metadata, and/or the like) in a manner described herein. For example, network device 250 may include a router, such as an ingress router, an egress router, a provider router (e.g., a provider edge router, a provider core router, and/or the like), a border router (e.g., an autonomous system border router), a label switching router (LSR), a label edge router (LER), a virtual router, and/or the like. Additionally, or alternatively, network device 250 may include a gateway, a switch, a firewall, a hub, a bridge, a reverse proxy, a server (e.g., a proxy server, a cloud server, a data center server, and/or the like), a load balancer, and/or a similar device. In some implementations, network device 250 may be a physical device implemented within a housing, such as a chassis. In some implementations, network device 250 may be a virtual device implemented by one or more computer devices of a cloud computing environment (e.g., cloud computing environment 230) or a data center. In some implementations, a group of network devices 250 may be a group of data center nodes that are used to route or otherwise transport traffic flows through network 240.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
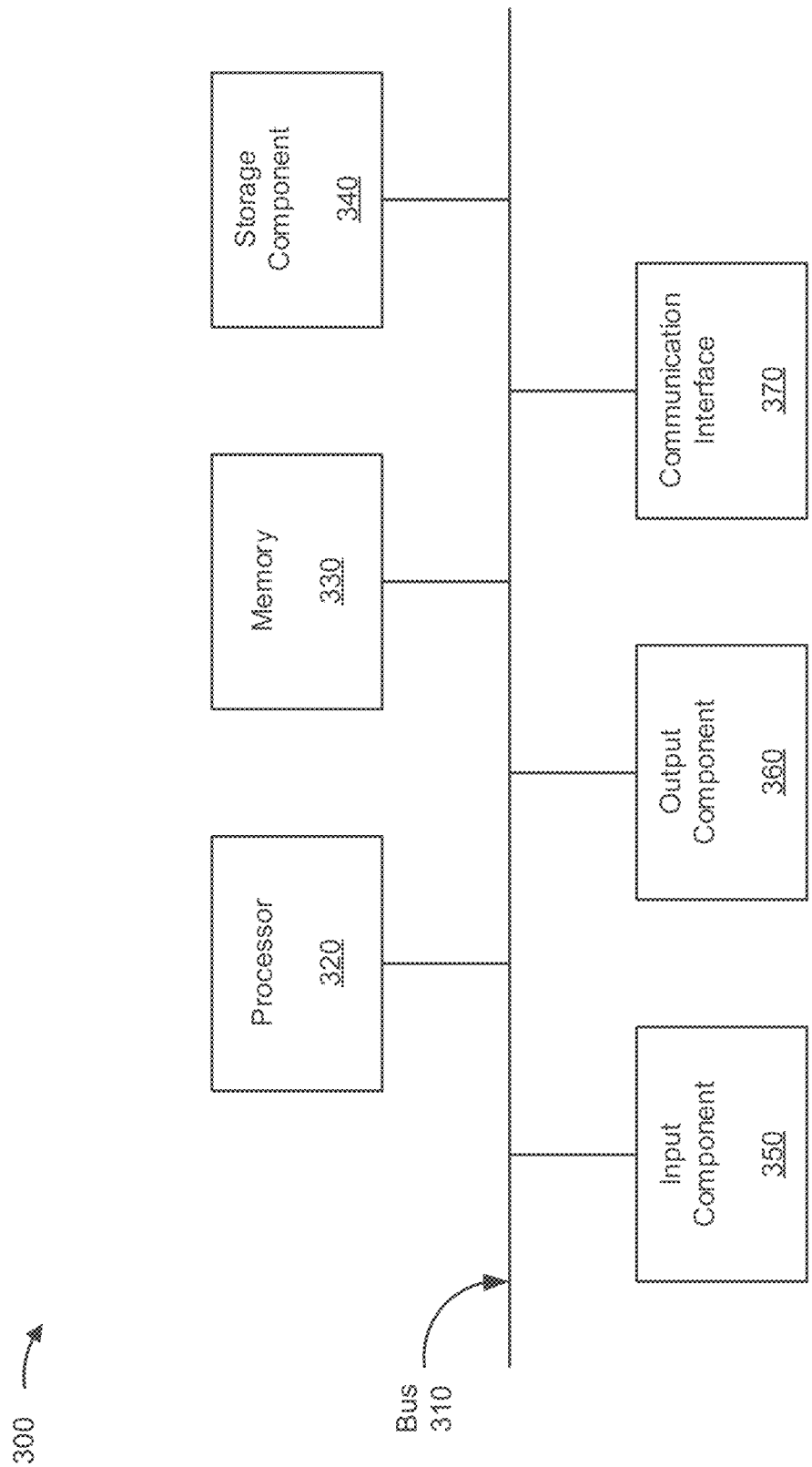
FIG. 3 is a diagram of example components of one or more devices of FIG. 2.

FIG. 3 is a diagram of example components of a device 300. Device 300 may correspond to client device 210, traffic planning platform 220, computing resource 232, network device 250, and/or the like. In some implementations, client device 210, traffic planning platform 220, computing resource 232, and/or network device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
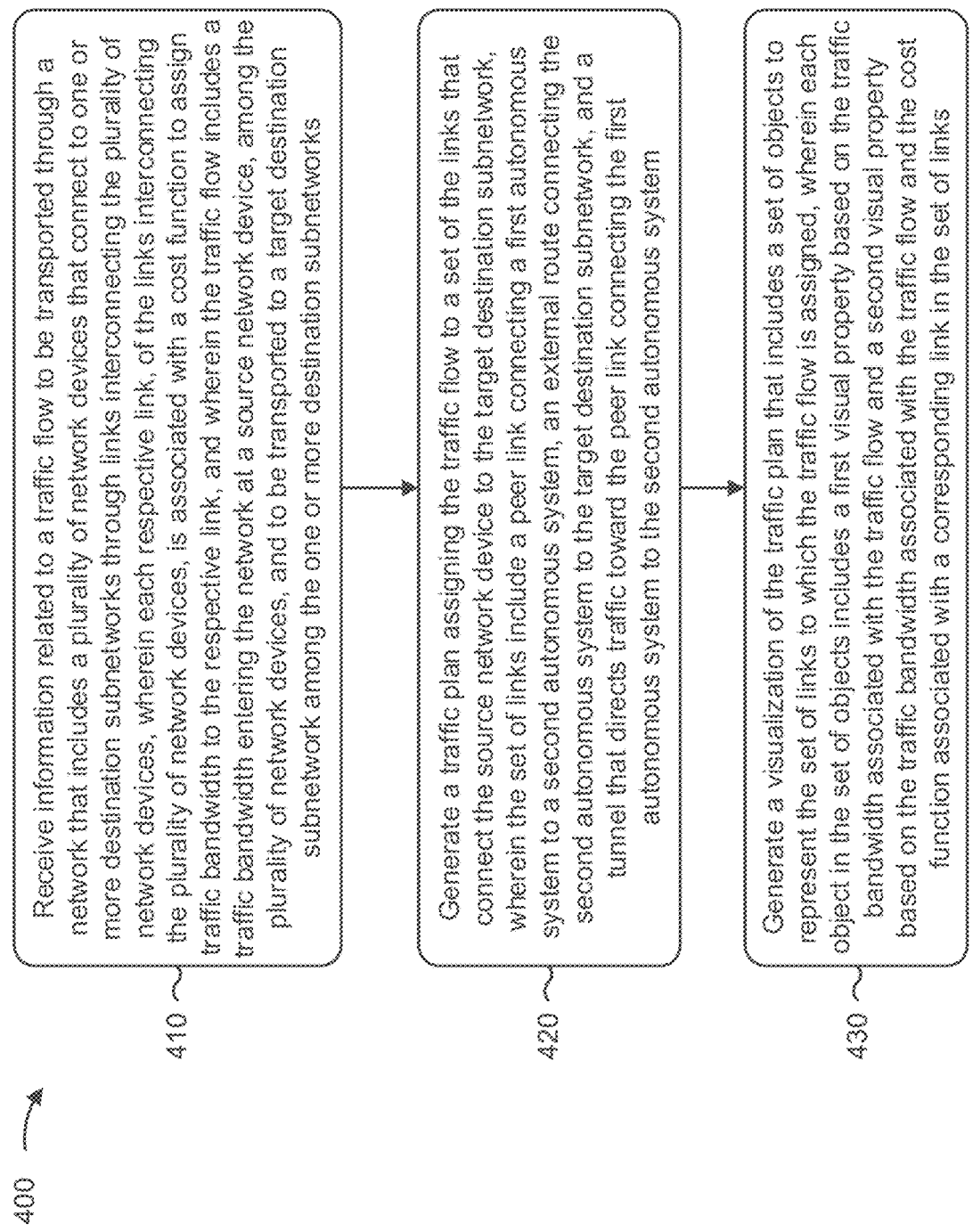
FIGS. 4-6 are flowcharts of example processes for visualizing network traffic plans based on egress peer engineering.

FIG. 4 is a flow chart of an example process 400 for visualizing network traffic plans based on egress peer engineering. In some implementations, one or more process blocks of FIG. 4 may be performed by a traffic planning platform (e.g., traffic planning platform 220). In some implementations, one or more process blocks of FIG. 4 may be performed by another device or a group of devices separate from or including the traffic planning platform, such as a client device 210 (e.g., client device 210), a network device (e.g., network device 250), and/or the like.

As shown in FIG. 4, process 400 may include receiving information related to a traffic flow to be transported through a network that includes a plurality of network devices that connect to one or more destination subnetworks through links interconnecting the plurality of network devices, wherein each respective link, of the links interconnecting the plurality of network devices, is associated with a cost function to assign traffic bandwidth to the respective link, and wherein the traffic flow includes a traffic bandwidth entering the network at a source network device, among the plurality of network devices, and to be transported to a target destination subnetwork among the one or more destination subnetworks (block 410). For example, the traffic planning platform (e.g., using computing resource 232, processor 320, memory 330, storage component 340, input component 350, output component 360, communication interface 370, and/or the like) may receive information related to a traffic flow to be transported through a network that includes a plurality of network devices that connect to one or more destination subnetworks through links interconnecting the plurality of network devices, as described above. In some implementations, each respective link, of the links interconnecting the plurality of network devices, is associated with a cost function to assign traffic bandwidth to the respective link. In some implementations, the traffic flow includes a traffic bandwidth entering the network at a source network device, among the plurality of network devices, and to be transported to a target destination subnetwork among the one or more destination subnetworks.

As further shown in FIG. 4, process 400 may include generating a traffic plan assigning the traffic flow to a set of the links that connect the source network device to the target destination subnetwork, wherein the set of links include a peer link connecting a first autonomous system to a second autonomous system, an external route connecting the second autonomous system to the target destination subnetwork, and a tunnel that directs traffic toward the peer link connecting the first autonomous system to the second autonomous system (block 420). For example, the traffic planning platform (e.g., using computing resource 232, processor 320, memory 330, storage component 340, input component 350, output component 360, communication interface 370, and/or the like) may generate a traffic plan assigning the traffic flow to a set of the links that connect the source network device to the target destination subnetwork, as described above. In some implementations, the set of links include a peer link connecting a first autonomous system to a second autonomous system, an external route connecting the second autonomous system to the target destination subnetwork, and a tunnel that directs traffic toward the peer link connecting the first autonomous system to the second autonomous system.

As further shown in FIG. 4, process 400 may include generating a visualization of the traffic plan that includes a set of objects to represent the set of links to which the traffic flow is assigned, wherein each object in the set of objects includes a first visual property based on the traffic bandwidth associated with the traffic flow and a second visual property based on the traffic bandwidth associated with the traffic flow and the cost function associated with a corresponding link in the set of links (block 430). For example, the traffic planning platform (e.g., using computing resource 232, processor 320, memory 330, storage component 340, input component 350, output component 360, communication interface 370, and/or the like) may generate a visualization of the traffic plan that includes a set of objects to represent the set of links to which the traffic flow is assigned, as described above. In some implementations, each object in the set of objects includes a first visual property based on the traffic bandwidth associated with the traffic flow and a second visual property based on the traffic bandwidth associated with the traffic flow and the cost function associated with a corresponding link in the set of links.

Process 400 may include additional implementations, such as any single implementation or any combination of implementations described below and/or in connection with one or more other processes described elsewhere herein.

In a first implementation, the set of objects to represent the set of links is a first set of objects, the visualization of the traffic plan further includes a second set of objects to represent the source network device and the target destination subnetwork, and each object in the second set of objects includes the first visual property and the second visual property.

In a second implementation, alone or in combination with the first implementation, the first set of objects and the second set of objects include geometric shapes, the first visual property includes a dimension for each of the geometric shapes that is proportional to a total traffic bandwidth assigned to the corresponding object, and the second visual property includes a color in a continuum to represent a cost to transport the total traffic bandwidth assigned to the corresponding object.

In a third implementation, alone or in combination with one or more of the first and second implementations, the visualization of the traffic plan further includes a geometric shape that represents the peer link, and the visualization of the traffic plan overlays a particular object in the set of objects that represents traffic bandwidth assigned to the peer link on the geometric shape that represents the peer link.

In a fourth implementation, alone or in combination with one or more of the first through third implementations, the geometric shape that represents the peer link includes an area to represent a capacity of the peer link, and the visualization of the traffic plan indicates that the peer link is overloaded when the particular object that represents traffic bandwidth assigned to the peer link has a larger area than the geometric shape that represents the peer link.

In a fifth implementation, alone or in combination with one or more of the first through fourth implementations, process 400 further includes implementing one or more changes to the traffic plan and rendering, in the visualization of the traffic plan, an animation depicting an effect of the one or more changes to the traffic plan. In some implementations, the one or more changes include reassigning the traffic flow to a different set of the links that also connect the source network device to the target destination subnetwork, and the effect of the one or more changes causes one or more of the first visual property or the second visual property to change during the animation.

In a sixth implementation, alone or in combination with one or more of the first through fifth implementations, the visualization is a Sankey diagram and/or an alluvial diagram in which colored shapes having respective sizes represent traffic bandwidths and costs based on the traffic flow assigned to the source network device, the peer link, and the target destination subnetwork and further in which colored bands having respective widths represent traffic bandwidths and costs based on the traffic flow assigned to the tunnel and the external route to which the traffic flow is assigned.

In a seventh implementation, alone or in combination with one or more of the first through sixth implementations, process 400 further includes receiving a request to trace a status associated with at least one of the set of objects and presenting, in the visualization of the traffic plan, information related to the status of the at least one of the set of objects. In some implementations, the presented information relates to one or more of the first visual property or the second visual property.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
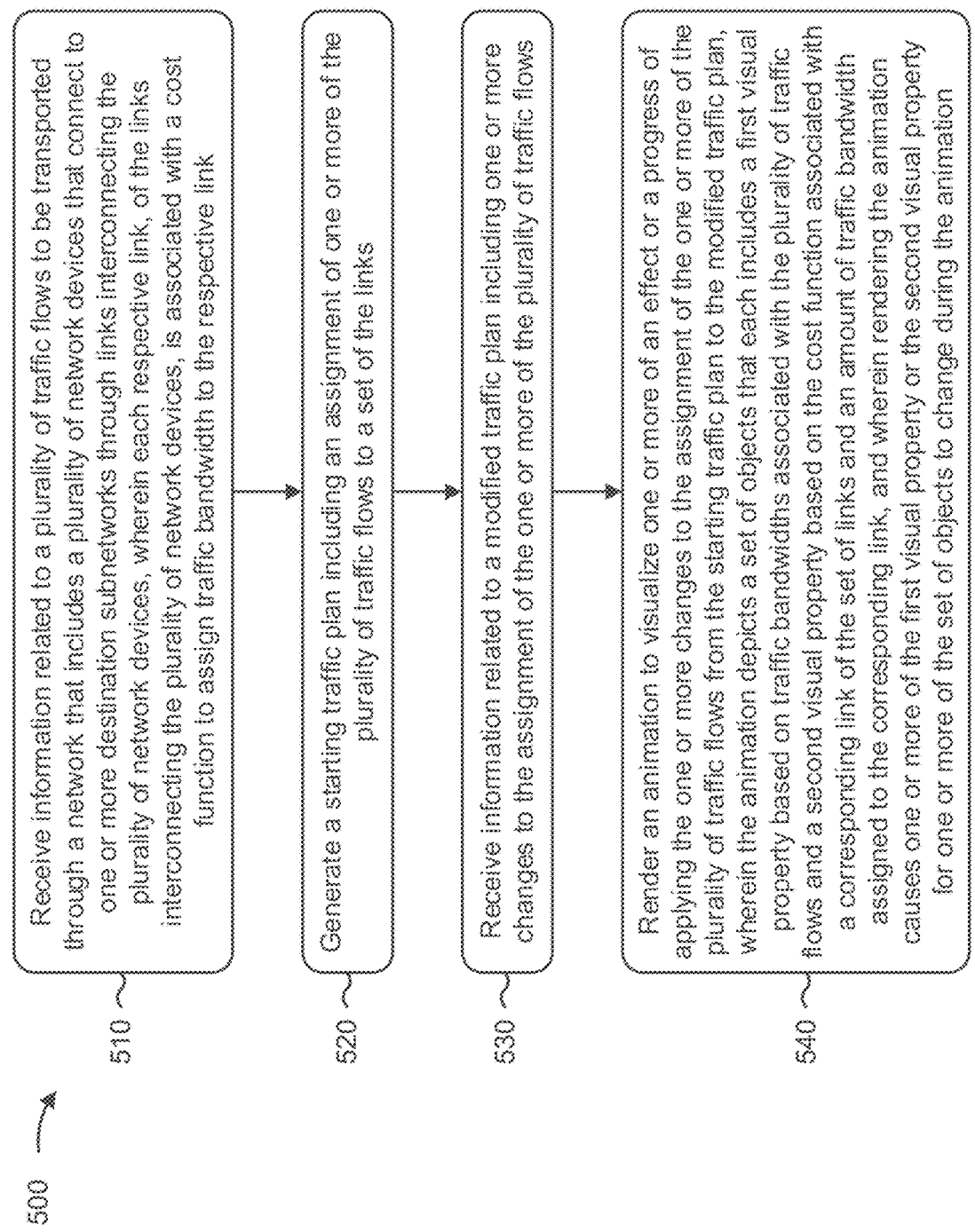

FIG. 5 is a flow chart of an example process 500 for visualizing network traffic plans based on egress peer engineering. In some implementations, one or more process blocks of FIG. 5 may be performed by a traffic planning platform (e.g., traffic planning platform 220). In some implementations, one or more process blocks of FIG. 5 may be performed by another device or a group of devices separate from or including the traffic planning platform, such as a client device 210 (e.g., client device 210), a network device (e.g., network device 250), and/or the like.

As shown in FIG. 5, process 500 may include receiving information related to a plurality of traffic flows to be transported through a network that includes a plurality of network devices that connect to one or more destination subnetworks through links interconnecting the plurality of network devices, wherein each respective link, of the links interconnecting the plurality of network devices, is associated with a cost function to assign traffic bandwidth to the respective link (block 510). For example, the traffic planning platform (e.g., using computing resource 232, processor 320, memory 330, storage component 340, input component 350, output component 360, communication interface 370, and/or the like) may receive information related to a plurality of traffic flows to be transported through a network that includes a plurality of network devices that connect to one or more destination subnetworks through links interconnecting the plurality of network devices, as described above. In some implementations, each respective link, of the links interconnecting the plurality of network devices, is associated with a cost function to assign traffic bandwidth to the respective link.

As further shown in FIG. 5, process 500 may include generating a starting traffic plan including an assignment of one or more of the plurality of traffic flows to a set of the links (block 520). For example, the traffic planning platform (e.g., using computing resource 232, processor 320, memory 330, storage component 340, input component 350, output component 360, communication interface 370, and/or the like) may generate a starting traffic plan including an assignment of one or more of the plurality of traffic flows to a set of the links, as described above.

As further shown in FIG. 5, process 500 may include receiving information related to a modified traffic plan including one or more changes to the assignment of the one or more of the plurality of traffic flows (block 530). For example, the traffic planning platform (e.g., using computing resource 232, processor 320, memory 330, storage component 340, input component 350, output component 360, communication interface 370, and/or the like) may receive information related to a modified traffic plan including one or more changes to the assignment of the one or more of the plurality of traffic flows, as described above.

As further shown in FIG. 5, process 500 may include rendering an animation to visualize one or more of an effect or a progress of applying the one or more changes to the assignment of the one or more of the plurality of traffic flows from the starting traffic plan to the modified traffic plan, wherein the animation depicts a set of objects that each includes a first visual property based on traffic bandwidths associated with the plurality of traffic flows and a second visual property based on the cost function associated with a corresponding link of the set of links and an amount of traffic bandwidth assigned to the corresponding link, and wherein rendering the animation causes one or more of the first visual property or the second visual property for one or more of the set of objects to change during the animation (block 540). For example, the traffic planning platform (e.g., using computing resource 232, processor 320, memory 330, storage component 340, input component 350, output component 360, communication interface 370, and/or the like) may render an animation to visualize one or more of an effect or a progress of applying the one or more changes to the assignment of the one or more of the plurality of traffic flows from the starting traffic plan to the modified traffic plan, as described above. In some implementations, the animation depicts a set of objects that each includes a first visual property based on traffic bandwidths associated with the plurality of traffic flows and a second visual property based on the cost function associated with a corresponding link of the set of links and an amount of traffic bandwidth assigned to the corresponding link. In some implementations, rendering the animation causes one or more of the first visual property or the second visual property for one or more of the set of objects to change during the animation.

Process 500 may include additional implementations, such as any single implementation or any combination of implementations described below and/or in connection with one or more other processes described elsewhere herein.

In a first implementation, the first visual property includes a dimension for each of the set of objects that is proportional to total traffic bandwidth assigned to a corresponding object of the set of objects, and the second visual property includes a color in a continuum to represent a cost to transport the total traffic bandwidth assigned to the corresponding object.

In a second implementation, alone or in combination with the first implementation, the cost function is based on one or more of a financial cost or a performance cost to transport traffic bandwidth through the respective link.

In a third implementation, alone or in combination with one or more of the first and second implementations, the starting traffic plan further includes one or more of the plurality of traffic flows that are unassigned, and one or more of the set of objects depicted in the animation have the first visual property and the second visual property to represent a traffic bandwidth and a cost penalty for the one or more of the plurality of traffic flows that are unassigned.

In a fourth implementation, alone or in combination with one or more of the first through third implementations, rendering the animation further causes one or more of the first visual property to transition in size or the second visual property to fade based on the modified traffic plan including an assignment of the one or more of the plurality of traffic flows.

In a fifth implementation, alone or in combination with one or more of the first through fourth implementations, process 500 further includes receiving a request to trace a status associated with at least one of the set of objects and presenting information related to the status of the at least one of the set of objects. In some implementations, the presented information relates to one or more of the first visual property or the second visual property.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
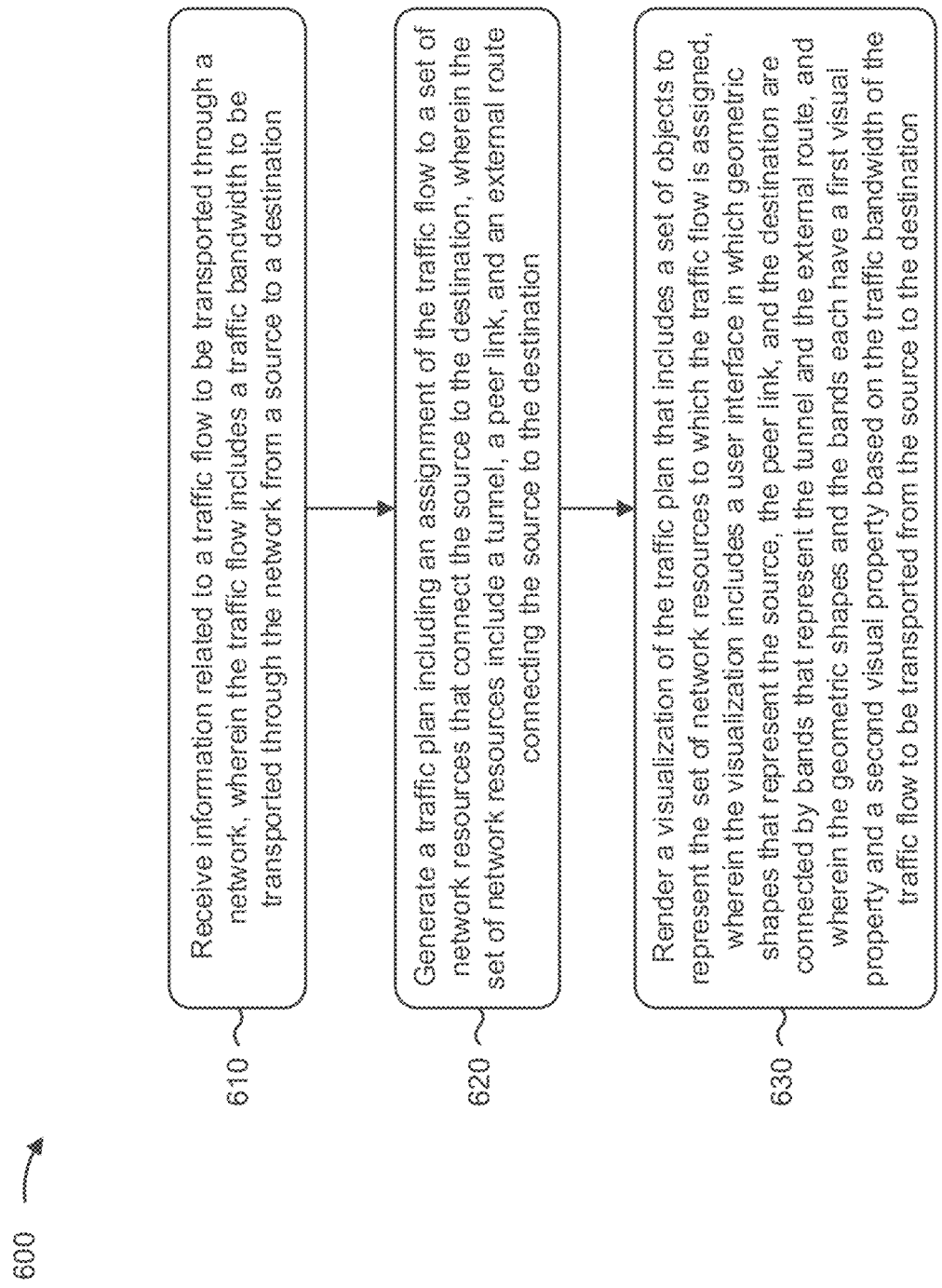

FIG. 6 is a flow chart of an example process 600 for visualizing network traffic plans based on egress peer engineering. In some implementations, one or more process blocks of FIG. 6 may be performed by a traffic planning platform (e.g., traffic planning platform 220). In some implementations, one or more process blocks of FIG. 6 may be performed by another device or a group of devices separate from or including the traffic planning platform, such as a client device 210 (e.g., client device 210), a network device (e.g., network device 250), and/or the like.

As shown in FIG. 6, process 600 may include receiving information related to a traffic flow to be transported through a network, wherein the traffic flow includes a traffic bandwidth to be transported through the network from a source to a destination (block 610). For example, the traffic planning platform (e.g., using computing resource 232, processor 320, memory 330, storage component 340, input component 350, output component 360, communication interface 370, and/or the like) may receive information related to a traffic flow to be transported through a network, as described above. In some implementations, the traffic flow includes a traffic bandwidth to be transported through the network from a source to a destination.

As further shown in FIG. 6, process 600 may include generating a traffic plan including an assignment of the traffic flow to a set of network resources that connect the source to the destination, wherein the set of network resources include a tunnel, a peer link, and an external route connecting the source to the destination (block 620). For example, the traffic planning platform (e.g., using computing resource 232, processor 320, memory 330, storage component 340, input component 350, output component 360, communication interface 370, and/or the like) may generate a traffic plan including an assignment of the traffic flow to a set of network resources that connect the source to the destination, as described above. In some implementations, the set of network resources include a tunnel, a peer link, and an external route connecting the source to the destination.

As further shown in FIG. 6, process 600 may include rendering a visualization of the traffic plan that includes a set of objects to represent the set of network resources to which the traffic flow is assigned, wherein the visualization includes a user interface in which geometric shapes that represent the source, the peer link, and the destination are connected by bands that represent the tunnel and the external route, and wherein the geometric shapes and the bands each have a first visual property and a second visual property based on the traffic bandwidth of the traffic flow to be transported from the source to the destination (block 630). For example, the traffic planning platform (e.g., using computing resource 232, processor 320, memory 330, storage component 340, input component 350, output component 360, communication interface 370, and/or the like) may render a visualization of the traffic plan that includes a set of objects to represent the set of network resources to which the traffic flow is assigned, as described above. In some implementations, the visualization includes a user interface in which geometric shapes that represent the source, the peer link, and the destination are connected by bands that represent the tunnel and the external route. In some implementations, the geometric shapes and the bands each have a first visual property and a second visual property based on the traffic bandwidth of the traffic flow to be transported from the source to the destination.

Process 600 may include additional implementations, such as any single implementation or any combination of implementations described below and/or in connection with one or more other processes described elsewhere herein.

In a first implementation, the first visual property includes a dimension that is proportional to a total traffic bandwidth assigned to the corresponding geometric shape or band.

In a second implementation, alone or in combination with the first implementation, the second visual property includes a color in a continuum to represent a cost to transport the total traffic bandwidth through the corresponding geometric shape or band.

In a third implementation, alone or in combination with one or more of the first and second implementations, process 600 further includes implementing one or more changes to the traffic plan and animating the visualization to depict the one or more changes to the traffic plan. In some implementations, the one or more changes include a modification to the assignment of the traffic flow to a different set of network resources that also connect the source to the destination.

In a fourth implementation, alone or in combination with one or more of the first through third implementations, the one or more changes depicted in the animated visualization include one or more of a change in color or a change in size for one or more of a corresponding geometric shape or band based on the modification to the assignment of the traffic flow.

In a fifth implementation, alone or in combination with one or more of the first through fourth implementations, process 600 further includes receiving a request to trace a status associated with at least one of the set of objects and presenting, in the visualization of the traffic plan, information related to the status of the at least one of the set of objects. In some implementations, the presented information relates to one or more of the first visual property or the second visual property.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, a set of configurations based on capabilities and/or specifications associated with a device on which the user interface is displayed, and/or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, information related to a traffic flow to be transported through a network that includes a plurality of network devices that connect to one or more destination subnetworks through links interconnecting the plurality of network devices,
        wherein each respective link, of the links interconnecting the plurality of network devices, is associated with a cost function to assign traffic bandwidth to the respective link, and
        wherein the traffic flow includes a traffic bandwidth entering the network at a source network device, among the plurality of network devices, and to be transported to a target destination subnetwork among the one or more destination subnetworks;
    generating, by the device, a traffic plan assigning the traffic flow to a set of the links that connect the source network device to the target destination subnetwork,
        wherein the traffic plan includes one or more other traffic flows that are unassigned, and
        wherein the set of the links include a peer link connecting a first autonomous system to a second autonomous system, an external route connecting the second autonomous system to the target destination subnetwork, and a tunnel that directs traffic toward the peer link connecting the first autonomous system to the second autonomous system; and
    generating, by the device, a visualization of the traffic plan that includes a set of objects to represent the set of the links to which the traffic flow is assigned and the one or more other traffic flows that are unassigned,
        wherein each object in the set of objects includes a first visual property based on the traffic bandwidth associated with the traffic flow and a second visual property based on the traffic bandwidth associated with the traffic flow and the cost function associated with a corresponding link in the set of the links.

2. The method of claim 1, wherein the set of objects to represent the set of the links is a first set of objects,
    wherein the visualization of the traffic plan further includes a second set of objects to represent the source network device and the target destination subnetwork, and
    wherein each object in the second set of objects includes the first visual property and the second visual property.

3. The method of claim 2, wherein the first set of objects and the second set of objects include geometric shapes,
    wherein the first visual property includes a dimension for each of the geometric shapes that is proportional to a total traffic bandwidth assigned to a corresponding object, and
    wherein the second visual property includes a color in a continuum to represent a cost to transport the total traffic bandwidth assigned to the corresponding object.

4. The method of claim 1, wherein the visualization of the traffic plan further includes a geometric shape that represents the peer link, and
    wherein the visualization of the traffic plan overlays a particular object in the set of objects that represents traffic bandwidth assigned to the peer link on the geometric shape that represents the peer link.

5. The method of claim 4, wherein the geometric shape that represents the peer link includes an area to represent a capacity of the peer link, and
    wherein the visualization of the traffic plan indicates that the peer link is overloaded when the particular object that represents traffic bandwidth assigned to the peer link has a larger area than the geometric shape that represents the peer link.

6. The method of claim 1, further comprising:
    implementing one or more changes to the traffic plan,
        wherein the one or more changes include reassigning the traffic flow to a different set of the links that also connect the source network device to the target destination subnetwork; and
    rendering, in the visualization of the traffic plan, an animation depicting an effect of the one or more changes to the traffic plan,
        wherein the effect of the one or more changes causes one or more of the first visual property or the second visual property to change during the animation.

7. The method of claim 1, wherein the visualization is one or more of a Sankey diagram or an alluvial diagram in which colored shapes having respective sizes represent traffic bandwidths and costs based on the traffic flow assigned to the source network device, the peer link, and the target destination subnetwork and further in which colored bands having respective widths represent traffic bandwidths and costs based on the traffic flow assigned to the tunnel and the external route to which the traffic flow is assigned.

8. The method of claim 1, further comprising:
    receiving a request to trace a status associated with at least one of the set of objects; and
    presenting, in the visualization of the traffic plan, information related to the status of the at least one of the set of objects, wherein the presented information relates to one or more of the first visual property or the second visual property.

9. A device, comprising:
one or more memories; and
one or more processors, communicatively coupled to the one or more memories, to:
receive information related to a plurality of traffic flows to be transported through a network that includes a plurality of network devices that connect to one or more destination subnetworks through links interconnecting the plurality of network devices,
wherein each respective link, of the links interconnecting the plurality of network devices, is associated with a cost function to assign traffic bandwidth to the respective link;
generate a starting traffic plan including an assignment of one or more of the plurality of traffic flows to a set of the links,
wherein the starting traffic plan includes one or more other traffic flows, of the plurality of traffic flows, that are unassigned;
receive information related to a modified traffic plan including one or more changes to the assignment of the one or more of the plurality of traffic flows; and
render an animation to visualize one or more of an effect or a progress of applying the one or more changes to the assignment of the one or more of the plurality of traffic flows from the starting traffic plan to the modified traffic plan,
wherein the animation depicts a set of objects that each includes a first visual property based on traffic bandwidths associated with the plurality of traffic flows and a second visual property based on the cost function associated with a corresponding link of the set of the links and an amount of traffic bandwidth assigned to the corresponding link,
wherein one or more of the set of objects are associated with representing the one or more other traffic flows that are unassigned and
wherein rendering the animation causes one or more of the first visual property or the second visual property for one or more of the set of objects to change during the animation.

10. The device of claim 9, wherein the first visual property includes a dimension for each of the set of objects that is proportional to total traffic bandwidth assigned to a corresponding object of the set of objects, and
wherein the second visual property includes a color in a continuum to represent a cost to transport the total traffic bandwidth assigned to the corresponding object.

11. The device of claim 9, wherein the cost function is based on one or more of a financial cost or a performance cost to transport traffic bandwidth through the respective link.

12. The device of claim 9, wherein one or more of the set of objects depicted in the animation have the first visual property and the second visual property to represent a traffic bandwidth and a cost penalty for the one or more of the plurality of traffic flows that are unassigned.

13. The device of claim 9, wherein rendering the animation further causes one or more of the first visual property to transition in size or the second visual property to fade based on the modified traffic plan including an assignment of the one or more of the plurality of traffic flows.

14. The device of claim 9, wherein the one or more processors are further to:
receive a request to trace a status associated with at least one of the set of objects; and
present information related to the status of the at least one of the set of objects,
wherein the presented information relates to one or more of the first visual property or the second visual property.

15. A non-transitory computer-readable medium storing instructions, the instructions comprising:
one or more instructions that, when executed by one or more processors, cause the one or more processors to:
receive information related to a traffic flow to be transported through a network,
wherein the traffic flow includes a traffic bandwidth to be transported through the network from a source to a destination;
generate a traffic plan including an assignment of the traffic flow to a set of network resources that connect the source to the destination,
wherein the traffic plan includes one or more other traffic flows that are unassigned, and
wherein the set of network resources include a tunnel, a peer link, and an external route connecting the source to the destination; and
render a visualization of the traffic plan that includes a set of objects to represent the set of network resources to which the traffic flow is assigned and the one or more other traffic flows that are unassigned,
wherein the visualization includes a user interface in which geometric shapes that represent the source, the peer link, and the destination are connected by bands that represent the tunnel and the external route, and
wherein the geometric shapes and the bands each have a first visual property and a second visual property based on the traffic bandwidth of the traffic flow to be transported from the source to the destination.

16. The non-transitory computer-readable medium of claim 15, wherein the first visual property includes a dimension that is proportional to a total traffic bandwidth assigned to a corresponding geometric shape of the geometric shapes or a corresponding band of the bands.

17. The non-transitory computer-readable medium of claim 16, wherein the second visual property includes a color in a continuum to represent a cost to transport the total traffic bandwidth through the corresponding geometric shape or band.

18. The non-transitory computer-readable medium of claim 15, wherein the one or more instructions, when executed by the one or more processors, further cause the one or more processors to:
implement one or more changes to the traffic plan,
wherein the one or more changes include a modification to the assignment of the traffic flow to a different set of network resources that also connect the source to the destination; and
animate the visualization to depict the one or more changes to the traffic plan.

19. The non-transitory computer-readable medium of claim 18, wherein the one or more changes depicted in the animated visualization include one or more of a change in color or a change in size for one or more of a corresponding geometric shape or band based on the modification to the assignment of the traffic flow.

20. The non-transitory computer-readable medium of claim 15, wherein the one or more instructions, when executed by the one or more processors, further cause the one or more processors to:
- receive a request to trace a status associated with at least one of the set of objects; and
- present, in the visualization of the traffic plan, information related to the status of the at least one of the set of objects,
    - wherein the presented information relates to one or more of the first visual property or the second visual property.

\* \* \* \* \*